United States Patent
Kalantari et al.

(10) Patent No.: US 11,929,792 B2
(45) Date of Patent: Mar. 12, 2024

(54) WIRELESS POWER TRANSFER USING DYNAMIC BEAMFORMING

(71) Applicant: Telefonaktiebolaget LM Ericsson (publ), Stockholm (SE)

(72) Inventors: Ashkan Kalantari, Malmö (SE); Shousheng He, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 131 days.

(21) Appl. No.: 17/791,291

(22) PCT Filed: Jan. 10, 2020

(86) PCT No.: PCT/EP2020/050505
§ 371 (c)(1),
(2) Date: Jul. 7, 2022

(87) PCT Pub. No.: WO2021/139893
PCT Pub. Date: Jul. 15, 2021

(65) Prior Publication Data
US 2023/0299812 A1    Sep. 21, 2023

(51) Int. Cl.
*H04B 5/00* (2006.01)
*H02J 50/20* (2016.01)
(Continued)

(52) U.S. Cl.
CPC ............ *H04B 5/0037* (2013.01); *H02J 50/20* (2016.02); *H02J 50/40* (2016.02); *H04B 5/02* (2013.01)

(58) Field of Classification Search
CPC ......... H04B 5/0037; H04B 5/02; H02J 50/20; H02J 50/40
See application file for complete search history.

(56) References Cited

U.S. PATENT DOCUMENTS 7,925,308 B2 * 4/2011 Greene ................. H02J 50/001
 455/343.1
9,030,161 B2    5/2015 Lu et al.
(Continued)

FOREIGN PATENT DOCUMENTS

WO    2014007415 A1    1/2014

OTHER PUBLICATIONS

Abeywickrama, et al., "Wireless Energy Beamforming Using Received Signal Strength Indicator Feedback," IEEE Transactions on Signal Processing, vol. 66, Issue 1, Jan. 2018, pp. 224-235.
(Continued)

*Primary Examiner* — Patrick O Neill
(74) *Attorney, Agent, or Firm* — Withrow & Terranova, PLLC

(57) ABSTRACT

Systems and methods are disclosed herein for Wireless Power Transfer (WPT) using radiative coupling and dynamic beamforming. In some embodiments, a method of operation of an Energy Transmitter (ET) comprises, for each time period ($TP_i$) of a plurality of time periods ($\{TP_i\}_{i=0,1,\ldots,I-1}$), for each time slot ($TS_{i,j}$) of one or more time slots ($\{TS_{i,j}\}_{j=0,1,\ldots,J-1}$), transmitting, during $TS_{i,j}$ of $TP_i$ on a frequency $f_{mod(i,2)}$, a radio frequency signal ($S_T(i,j)$) that is modulated with a signature of a particular Energy Harvester (EH). The method further comprises, for each $TP_i$, attempting, during $TP_i$, to receive, from the particular EH on a frequency $f_{mod(i+1,2)}$, a radio frequency signal ($S_R(i)$) that is modulated with the signature of the particular EH. In this manner, continuous WPT is provided. Corresponding embodiments of an ET are also disclosed. Embodiments of a method performed by an EH and corresponding embodiments of an EH are also disclosed.

19 Claims, 14 Drawing Sheets

(51) Int. Cl.
*H02J 50/40* (2016.01)
*H04B 5/02* (2006.01)

(56) References Cited

U.S. PATENT DOCUMENTS

2015/0303741 A1\* 10/2015 Malik ................... H02J 50/80
  307/104
2021/0320530 A1\* 10/2021 Lee ..................... H02J 50/402

OTHER PUBLICATIONS

International Search Report and Written Opinion for International Patent Application No. PCT/EP2020/050505, dated Aug. 3, 2020, 13 pages.
International Preliminary Report on Patentability for International Patent Application No. PCT/EP2020/050505, dated Nov. 11, 2021, 20 pages.

\* cited by examiner

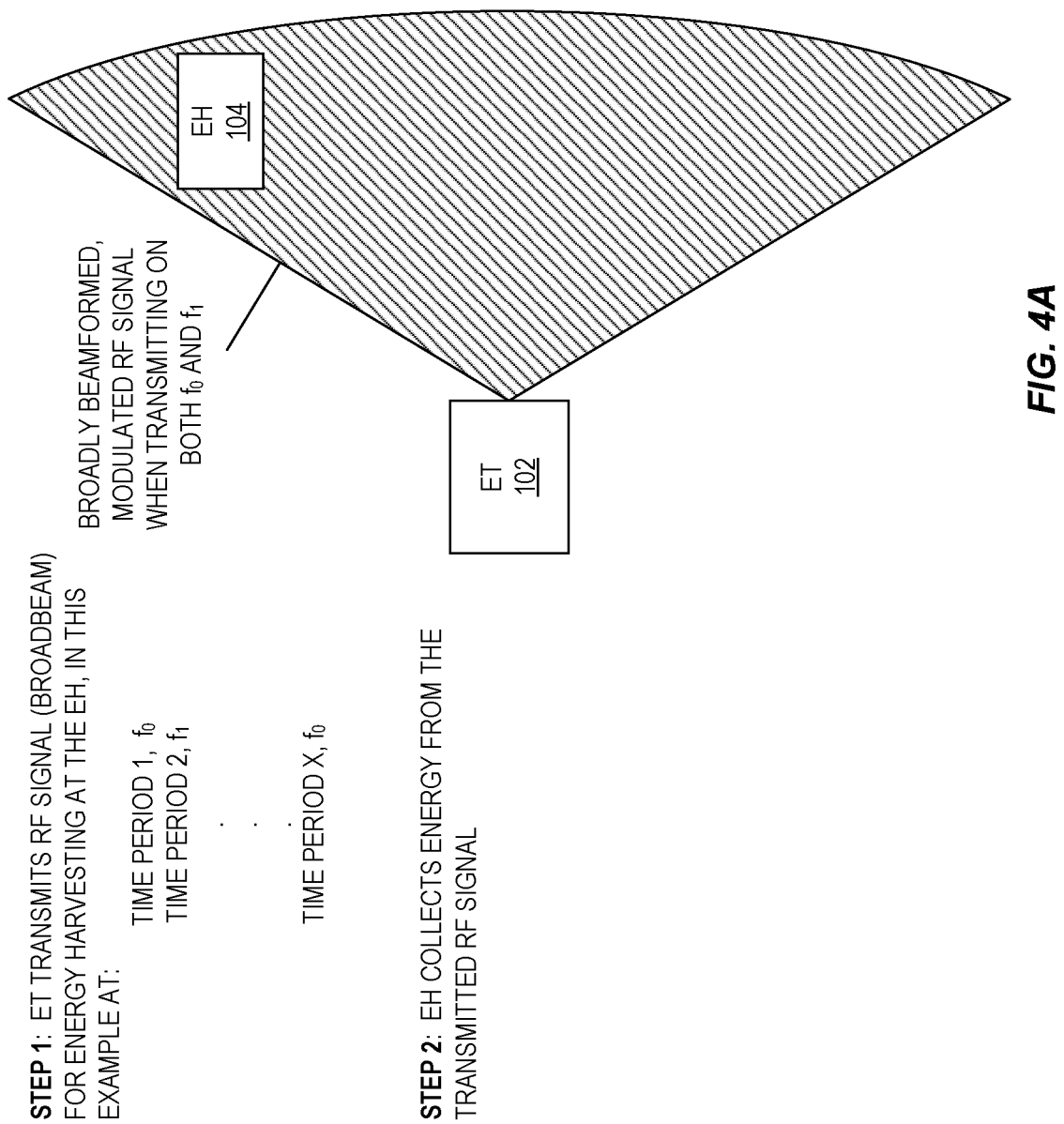

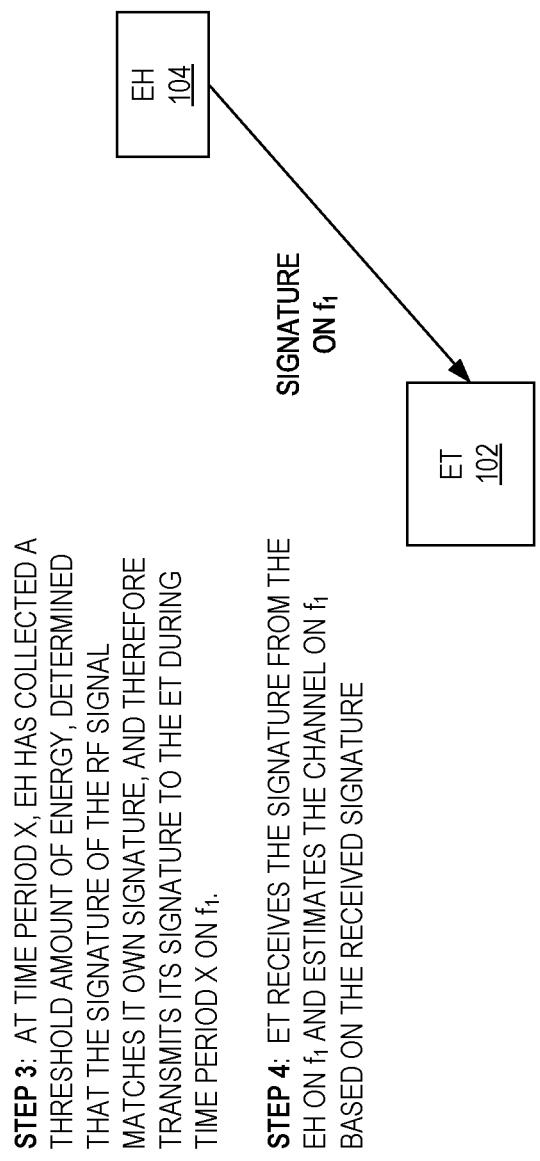

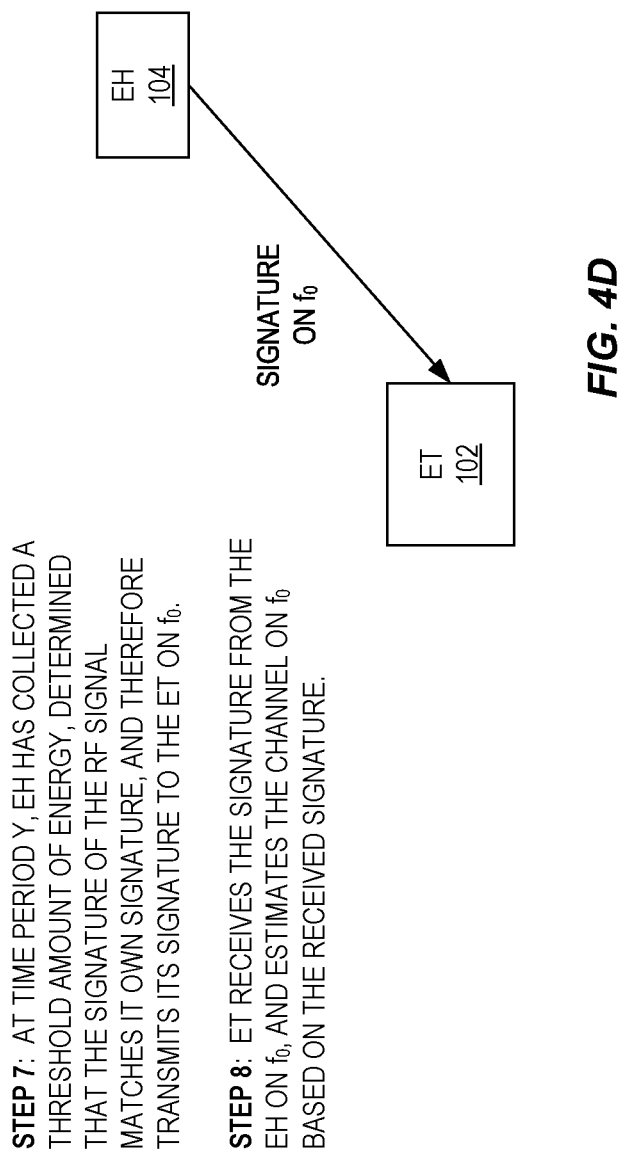

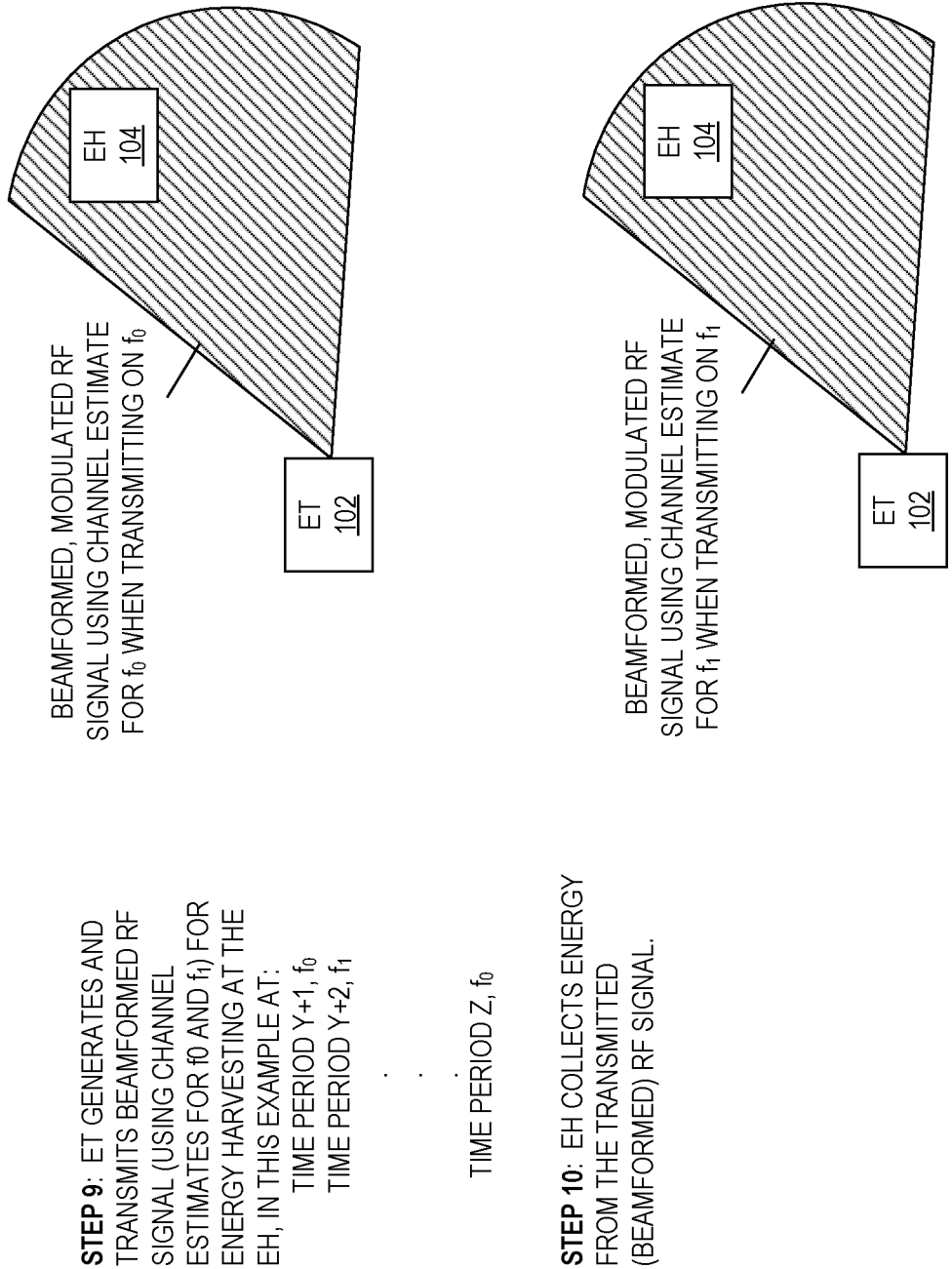

WIRELESS POWER TRANSFER USING DYNAMIC BEAMFORMING

This application is a 35 U.S.C. § 371 national phase filing of International Application No. PCT/EP2020/050505, filed Jan. 10, 2020, the disclosure of which is incorporated herein by reference in its entirety.

TECHNICAL FIELD

The present disclosure relates to Wireless Power Transfer (WPT) and, in particular, to WPT using radiative coupling and beamforming.

BACKGROUND

Radio Frequency (RF) energy harvesting is one of the emerging Wireless Power Transfer (WPT) schemes, not only for wireless charging, i.e. with inductive coupling, but also for energizing a far field passive device, i.e. with radiative coupling, to enable processing and wireless communication at that device.

In a radiative coupled system, the Energy Transmitter (ET) can use beamforming to increase the energy transmission range and focus. Beamforming can be carried using multiple antenna elements, i.e. an antenna array, to efficiently concentrate the radio energy toward a specific device, referred to herein as the Energy Harvester (EH), under restrictive regulations. However, beamforming requires the Channel State Information (CSI) at the ET. When the EH is a passive device, neither the power consuming channel estimation nor a qualified CSI feedback from EH is possible since the EH does not have power to receive or send any signal initially.

There have been recent research works for wireless power and information transfer. Reference [1] proposes an approach for wireless power transfer to one device where the energy signal may be transmitted via a range of unused frequencies toward the target device.

One or more charging panels in [2] are used to charge one or more devices. The panels can collaborate to form an array to charge the target devices. The panels are capable of transmitting wireless power and also receiving the pilot from the target devices. The charging panels switch between power delivery and radar mode where they use the radar mode to sense the transmitted pilots of the charged devices for channel estimation.

The work in [3] beamforms the energy toward one or more devices using the beamforming vectors in a codebook. Received Signal Strength Indicator (RSSI) in terms of a 1-bit feedback from the receiver device is used for iterative assessment of beamforming effect at the energy transmitter side. In particular, the 1-bit feedback in [3] is used to inform the energy transmitter of the power received by the energy harvester. This feedback bit is used to indicate, e.g., if the current transmission is better or worse than a previous transmission. Reference [3] mentions that the sensors use orthogonal channels to send their RSSI to the energy transmitter without interference.

SUMMARY

Systems and methods are disclosed herein for Wireless Power Transfer (WPT) using radiative coupling and dynamic beamforming. Embodiments of a method of operation of an energy transmitter are disclosed. In some embodiments, a method of operation of an energy transmitter comprises, for each time period ($TP_i$) of a plurality of time periods ($\{TP_i\}_{i=0,1,\ldots,I-1}$) where I is a positive integer that is greater than or equal to 2 and e.g., less than or equal to some predefined maximum number of time periods, for each time slot ($TS_{i,j}$) of one or more time slots ($\{TS_{i,j}\}_{j=0,1,\ldots,J-1}$) where J is a positive integer that is greater than or equal to 1 and, e.g., less than or equal to some predefined maximum number of slots for the time period ($TP_i$), transmitting, during the time slot ($TS_{i,j}$) of the time period ($TP_i$) on a frequency $f_{mod(i,2)}$, a radio frequency signal ($S_T(i,j)$) that is modulated with a signature of a particular energy harvester, wherein mod(*) is the modulo-2 operator such that $f_{mod(i,2)}$ is a first frequency $f_0$ for even values of i including i=0 and is a second frequency $f_1$ for odd values of i. The method further comprises, for each time period ($TP_i$) of the plurality of time periods ($\{TP_i\}_{i=0,1,\ldots,I-1}$), attempting, during the time period ($TP_i$), to receive, from the particular energy harvester on a frequency $f_{mod(i+1,2)}$, a radio frequency signal ($S_R(i)$) that is modulated with the signature of the particular energy harvester, wherein mod(*) is the modulo-2 operator such that $f_{mod(i+1,2)}$ is the second frequency $f_1$ for even values of i including i=0 and is the first frequency $f_0$ for odd values of i. In this manner, the energy transmitter is enabled to perform continuous WPT.

In some embodiments, for a particular time period ($TP_{i=x}$) where x∈{0, 1, ..., I-1}, attempting to receive, from the particular energy harvester on the frequency $f_{mod(i+1,2)}$, the radio frequency signal ($S_R(i)$) that is modulated with the signature of the particular energy harvester comprises receiving, during the particular time period ($TP_{i=x}$) from the particular energy harvester on a frequency $f_{mod(x+1,2)}$, a radio frequency signal ($S_R(i=x)$) that is modulated with the signature of the particular energy harvester.

In some embodiments, the method further comprises estimating a wireless channel between the energy transmitter and the particular energy harvester for the frequency $f_{mod(x+1,2)}$ based on the radio frequency signal ($S_R(i=x)$) received on the frequency $f_{mod(x+1,2)}$ during the particular time period ($TP_{i=x}$) to provide a channel estimate for the frequency $f_{mod(x+1,2)}$. For a second particular time period ($TP_{i=x+1}$), for each time slot ($TS_{i,j}$) of the one or more time slots ($\{TS_{i,j}\}_{j=0,1,\ldots,J-1}$) for the second particular time period ($TP_{i=x+1}$), the method further comprises generating, using the channel estimate for the frequency $f_{mod(x+1,2)}$, a beamformed radio frequency signal that is modulated with the signature of the particular energy harvester. Further, transmitting, during the time slot ($TS_{i,j}$) of the time period ($TP_i$) on the frequency $f_{mod(i,2)}$, the radio frequency signal ($S_T(i,j)$) that is modulated with the signature of the particular energy harvester comprises transmitting, during the time slot ($TS_{i,j}$) of the time period ($TP_{i=x+1}$) on the frequency $f_{mod(x+1,2)}$, the beamformed radio frequency signal that is modulated with the signature of the particular energy harvester as a radio frequency signal ($S_{T(i=x+1)}$).

In some embodiments, for a third particular time period ($TP_{i=y}$) where y>x and a value of y is such that a frequency $f_{mod(y+1,2)}$ is the same as the frequency $f_{mod(x+1,2)}$, attempting to receive, from the particular energy harvester on the frequency $f_{mod(i+1,2)}$, the radio frequency signal ($S_R(i)$) that is modulated with the signature of the particular energy harvester comprises receiving, during the third particular time period ($TP_{i=y}$) from the particular energy harvester on the frequency $f_{mod(y+1,2)}$, a radio frequency signal ($S_R(i=y)$) that is modulated with the signature of the particular energy harvester. In some embodiments, the method further comprises updating the channel estimate for the frequency $f_{mod(y+1,2)}$ based on the radio frequency signal ($S_R(i=y)$)

received on the frequency $f_{mod(y+1,2)}$ during the third particular time period ($TP_{i=y}$). For a fourth particular time period ($TP_{i=y+1}$), for each time slot ($TS_{i,j}$) of the one or more time slots ($\{TS_{i,j}\}_{j=0,1,\ldots,J-1}$) for the fourth particular time period ($TP_{i=y+1}$), the method further comprises generating, using the updated channel estimate for the frequency $f_{mod(y+1,2)}$, a new beamformed radio frequency signal that is modulated with the signature of the particular energy harvester. Further, transmitting, during the time slot ($TS_{i,j}$) of the time period ($TP_i$) on the frequency $f_{mod(i,2)}$, a radio frequency signal $S_T(i,j)$ that is modulated with the signature of the particular energy harvester comprises transmitting, during the time slot ($TS_{i,j}$) of the fourth particular time period ($TP_{i=y+1}$) on the frequency $f_{mod(y+1,2)}$, the new beamformed radio frequency signal that is modulated with the signature of the particular energy harvester as a radio frequency signal ($S_T(i=y+1)$).

In some embodiments, for a first time period ($TP_{i=0}$) of the plurality of time periods ($\{TP_i\}_{i=0,1,\ldots,I-1}$), for each time slot ($TS_{i,j}$) of the one or more time slots ($\{TS_{i,j}\}_{j=0,1,\ldots,J-1}$) for the first time period ($TP_{i=0}$), transmitting the radio frequency signal ($S_T(i,j)$) that is modulated with the signature of the particular energy harvester comprises transmitting, during the time slot ($TS_{i,j}$) of the first time period ($TP_{i=0}$), a broadly beamformed or non-beamformed radio frequency signal that is modulated with the signature of the particular energy harvester as a radio frequency signal ($S_T(i=0,j)$).

In some embodiments, for each time slot ($TS_{i,j}$) of each time period ($TP_i$), the radio frequency signal ($S_T(i,j)$) that is modulated with the signature of the particular energy harvester is a spread spectrum radio frequency signal that is modulated with the signature of the particular energy harvester. In some embodiments, the signature of the particular energy harvester is a particular spread spectrum signature assigned to the particular energy harvester.

In some embodiments, the one or more time slots ($\{TS_{i,j}\}_{j=0,1,\ldots,J-1}$) consist of a single time slot. In some other embodiments, the one or more time slots ($\{TS_{i,j}\}_{j=0,1,\ldots,J-1}$) comprise more than one time slot.

In some embodiments, the first frequency $f_0$ and the second frequency $f_1$ are both in an Industrial, Scientific, and Medical (ISM) frequency band. In some embodiments, the first frequency $f_0$ and the second frequency $f_1$ are both in an unlicensed frequency band.

Corresponding embodiments of an energy harvester are also disclosed. In some embodiments, an energy harvester is adapted to for each time period ($TP_i$) of a plurality of time periods ($\{TP_i\}_{i=0,1,\ldots,I-1}$) where I is a positive integer that is greater than or equal to 2 and, e.g., less than or equal to some predefined maximum number of time periods, for each time slot ($TS_{i,j}$) of one or more time slots ($\{TS_{i,j}\}_{j=0,1,\ldots,J-1}$) where J is a positive integer that is greater than or equal to 1 and, e.g., less than or equal to some predefined maximum number of slots for the time period ($TP_i$), transmit, during the time slot ($TS_{i,j}$) of the time period ($TP_i$) on a frequency $f_{mod(i,2)}$, a radio frequency signal ($S_T(i,j)$) that is modulated with a signature of a particular energy harvester, wherein mod(*) is the modulo-2 operator such that $f_{mod(i,2)}$ is a first frequency $f_0$ for even values of i including i=0 and is a second frequency $f_1$ for odd values of i. The energy harvester is further adapted to, for each time period ($TP_i$) of the plurality of time periods ($\{TP_i\}_{i=0,1,\ldots,I-1}$), attempt, during the time period ($TP_i$), to receive, from the particular energy harvester on a frequency $f_{mod(i+1,2)}$, a radio frequency signal ($S_R(i)$) that is modulated with the signature of the particular energy harvester, wherein mod(*) is the modulo-2 operator such that $f_{mod(i+1,2)}$ is the second frequency $f_1$ for even values of i including i=0 and is the first frequency $f_0$ for odd values of i.

In some embodiments, the energy harvester comprises one or more transmitters, one or more receivers, a plurality of antennas coupled to the one or more transmitters and the one or more receivers, and processing circuitry connected to the one or more transmitters and the one or more receivers. The processing circuitry is configured to cause the energy transmitter to, for each time period ($TP_i$) of the plurality of time periods ($\{TP_i\}_{i=0,1,\ldots,I-1}$), for each time slot ($TS_{i,j}$) of one or more time slots ($\{TS_{i,j}\}_{j=0,1,\ldots,J-1}$) where J is a positive integer that is greater than or equal to 1 and, e.g., less than or equal to some predefined maximum number of slots for the time period ($TP_i$), transmit, during the time slot ($TS_{i,j}$) of the time period ($TP_i$) on the frequency $f_{mod(i,2)}$, the radio frequency signal ($S_T(i,j)$) that is modulated with the signature of the particular energy harvester. The processing circuitry is further configured to cause the energy transmitter to, for each time period ($TP_i$) of the plurality of time periods ($\{TP_i\}_{i=0,1,\ldots,I-1}$), attempt, during the time period ($TP_i$), to receive, from the particular energy harvester on the frequency $f_{mod(i+1,2)}$, a radio frequency signal ($S_R(i)$) that is modulated with the signature of the particular energy harvester.

Embodiments of a method of operation of an energy harvester are also disclosed. In some embodiments, a method of operation of an energy harvester comprises attempting to collect energy from a radio frequency signal on both a first frequency and a second frequency, determining that a threshold amount of energy has been collected and that a signature of the radio frequency signal matches a signature of the energy harvester, and determining whether the signature of the radio frequency signal that matches the signature of the energy harvester was detected on the first frequency or the second frequency. The method further comprises, upon determining that the signature of the radio frequency signal that matches the signature of the energy harvester was detected on the first frequency, transmitting a radio frequency signal modulated with the signature of the energy harvester on the second frequency. The method further comprises, upon determining that the signature of the radio frequency signal that matches the signature of the energy harvester was detected on the second frequency, transmitting the radio frequency signal modulated with the signature of the energy harvester on the first frequency.

In some embodiments, the method further comprises repeating the aforementioned process one or more additional times.

In some embodiments, the method further comprises determining that an amount of energy needed to perform a desired task has been collected and, upon determining that the amount of energy needed to perform the desired task has been collected, performing the desired task.

Embodiments of an energy harvester are also disclosed. In some embodiments, an energy harvester is adapted to attempt to collect energy from a radio frequency signal on both a first frequency and a second frequency, determine that a threshold amount of energy has been collected and that a signature of the radio frequency signal matches a signature of the energy harvester, and determine whether the signature of the radio frequency signal that matches the signature of the energy harvester was detected on the first frequency or the second frequency. The energy harvester is further adapted to, upon determining that the signature of the radio frequency signal that matches the signature of the energy harvester was detected on the first frequency, transmit a radio frequency signal modulated with the signature of the energy harvester on the second frequency. The energy harvester is further adapted to, upon determining that the signature of the radio frequency signal that matches the signature of the energy harvester was detected on the second frequency, transmit the radio frequency signal modulated with the signature of the energy harvester on the first frequency.

In some embodiments, the energy harvester comprises one or more transmitters, one or more receivers, passive energy harvesting circuitry, one or more antennas coupled to the one or more transmitters, the one or more receivers, and the passive energy harvesting circuitry, processing circuitry connected to the one or more transmitters and the one or more receivers, and an energy storage device. The passive energy harvesting circuitry attempts to collect energy from a radio frequency signal on both a first frequency and a second frequency and store the collected energy in the energy storage device. The processing circuitry is configured to cause the energy harvester to determine that a threshold amount of energy has been collected and stored in the energy storage device and that a signature of the radio frequency signal matches a signature of the energy harvester and determine whether the signature of the radio frequency signal that matches the signature of the energy harvester was detected on the first frequency or the second frequency. The processing circuitry is further configured to cause the energy harvester to, upon determining that the signature of the radio frequency signal that matches the signature of the energy harvester was detected on the first frequency, transmit a radio frequency signal modulated with the signature of the energy harvester on the second frequency. The processing circuitry is further configured to cause the energy harvester to, upon determining that the signature of the radio frequency signal that matches the signature of the energy harvester was detected on the second frequency, transmit the radio frequency signal modulated with the signature of the energy harvester on the first frequency.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 4A through 4G illustrate the operation of the ET and the target EH to perform a dual-frequency cross-hopping Wireless Power Transfer (WPT) procedure in accordance with some embodiments of the present disclosure;

DETAILED DESCRIPTION

Figure 1:
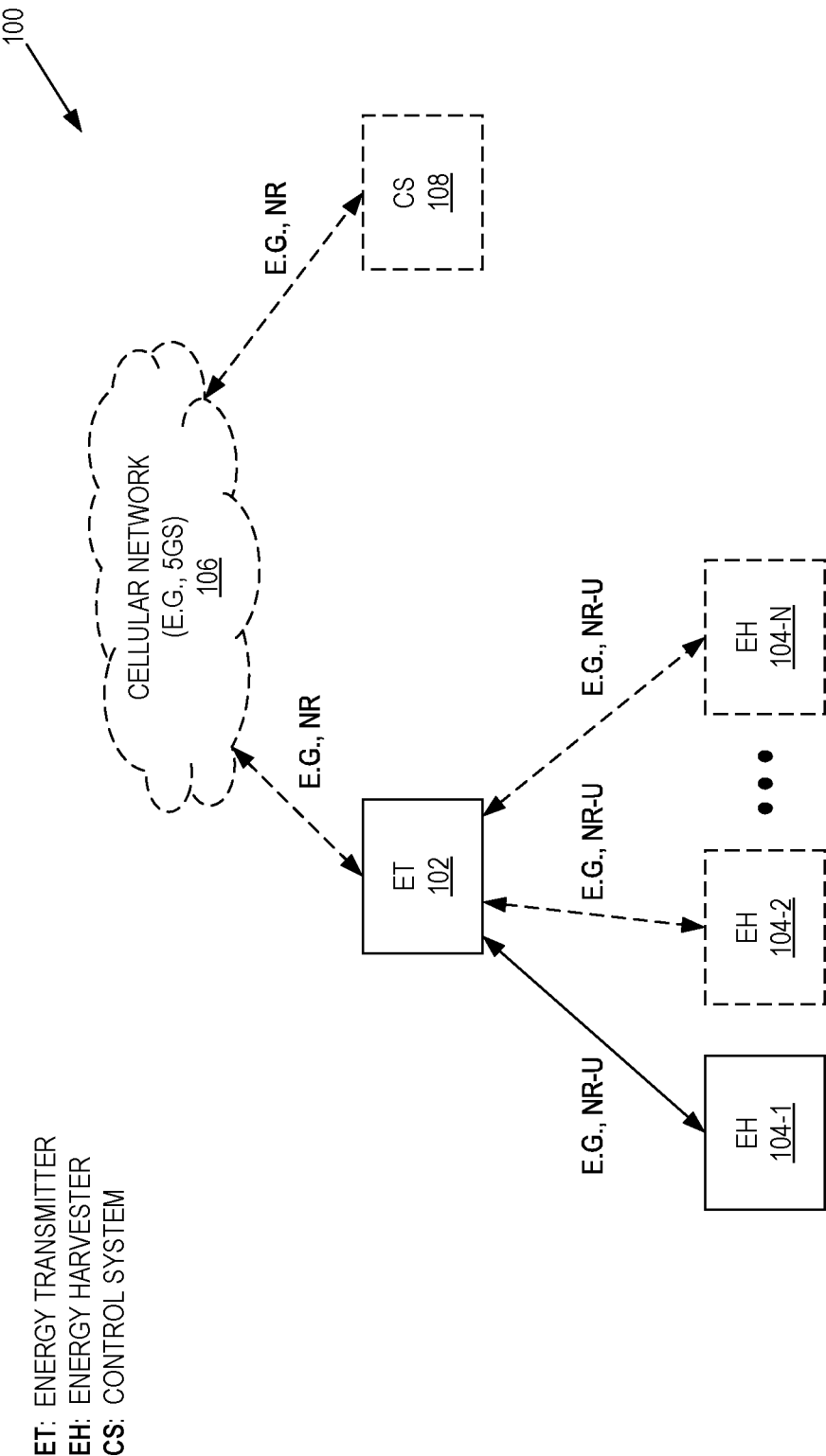
FIG. 1 illustrates one example of a system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Energy Transmitter (ET): As used herein, an "energy transmitter" or "ET" is any device that wirelessly transmits a beamformed Radio Frequency (RF) signal towards another device (i.e., an Energy Harvester (EH)) for purposes of energy harvesting at the other device. As an example, an ET may be a radio access node in a cellular communications system (e.g., a base station such as, e.g., a New Radio (NR) base station (referred to as a gNB) in a Fifth Generation (5G) System (5GS)), a moving radio access node in a cellular communications system (e.g., an "in the air" base station such as a base station implemented in or attached to a drone or other flying apparatus in a cellular communications system (e.g., a 5GS)), a wireless device (e.g., a drone User Equipment (UE)—i.e., a UE implemented in or attached to a drone or other flying apparatus) in a cellular communications system (e.g., a 5GS), or the like.

Energy Harvester (EH): As used herein, an "energy harvester" or "EH" is any device that collects energy from a (wireless) RF signal via radiative coupling. In some embodiments, an EH does not include a battery or any other power source and operates solely using energy collected via Wireless Power Transfer (WPT) using radiative coupling. As an example, an EH may be a wireless device (e.g., an Internet of Things (IoT) device or Machine Type Communication (MTC) device) in a cellular communications system (e.g., a 5GS).

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a gNB in a Third Generation Partnership Project (3GPP) 5G NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Communication Device: As used herein, a "communication device" is any type of device that has access to an access network. Some examples of a communication device include, but are not limited to: a mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a UE in a 3GPP network, a MTC device, and an IoT device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device enabled to communicate voice and/or data via a wireless connection.

Note that the description given herein sometimes uses a 3GPP cellular communications system as an example and, as such, 3GPP terminology or terminology similar to 3GPP terminology is sometimes used. However, the concepts disclosed herein are not limited to a 3GPP system.

Problems exist with the current solutions for WPT using radiative coupling and beamforming. The current works (i.e., references [1], [2], and [3]) do not include a device identification signature in the RF signal transmitted by the ET. This results in multiple EHs replying at the same time and requires orthogonal channels to avoid interference among those EHs. However, allocating these channels occupies spectrum. In addition, most of the current works use a codebook for beamforming at the ET, which is less flexible compared to Channel State Information (CSI) based beamforming. The codebook-based beamforming approach reduces the complexity of feedback, but still needs to support Received Signal Strength Indicator (RSSI) transmission at the cost of extra power and spectrum resources. In addition, in a codebook-based beamforming approach, the EH has to transmit RSSI even for codebook entries that do not send energy to the EH. This excludes the EH from being a passive device.

Systems and methods are disclosed herein that provide solutions to the aforementioned and/or other problems. In some embodiments, an ET transmits an RF signal to target one specific passive device, i.e. one specific EH, and charge that specific passive device. The transmitted RF signal is modulated using a signature so that the receiving device knows if it should reply or not. In some embodiments, the transmitted signal is a spread spectrum RF signal, and the signature is a spread spectrum signature. In one embodiment, Direct Sequence Spread Spectrum (DSSS) is used, where DSSS means using a pseudorandom sequence to modulate each information bit, thereby expanding the spectrum relative to the information sequence. Thus, in some embodiments, the spread spectrum signature of the EH is a particular pseudorandom sequence used to modulate each information bit, e.g., of a predefined information sequence. This predefined information sequence may be the same for all EHs, but the EHs would be associated with different pseudorandom sequences. Initially, before the ET knows a channel estimate for the wireless channel between the ET and the EH (e.g., before the ET knows CSI for the wireless channel), the transmitted RF signal is either broadly beamformed or not beamformed at all (i.e., is non-beamformed). After collecting enough energy, the EH transmits an RF signal modulated with the same signature back to the ET at a different frequency, i.e. cross-frequency, so that the ET can estimate the wireless channel between the ET and the EH (e.g., estimate the CSI for the wireless channel between the ET and the EH). The ET uses the channel estimate (e.g., the estimated CSI) to beamform the transmitted RF signal to thereby concentrate the signal beam on the EH. This process is repeated to update the channel estimate and update the beamforming of the transmitted RF signal to sequentially further concentrate the signal beam on the EH until the EH collects enough energy to perform a desired task. This desired task may be obtaining data (e.g., one or more measurements) and transmitting data to, e.g., the ET or another node (e.g., a base station in a cellular communications system).

In the preferred embodiments described herein, the RF signal transmitted by the ET and the signature feedback transmitted by the EH are carried out on two different frequencies to enable continuous WPT. In some embodiments, this is done using a cross-hop scheme where the RF signal transmission from the ET and the signature feedback transmission from the EH hop between two different frequencies. Continuous WPT is achieved due to the fact that the cross-hop scheme utilizes a combination of Time Division Duplexing (TDD) and Frequency Division Duplexing (FDD) to partition the WPT from the ET and the signature feedback transmission from the EH into two different time-frequency grids.

In some embodiments, the WPT scheme described herein uses two different frequencies for WPT and channel estimation and periodically switches these two frequencies to ensure continuous channel tracking and efficient wireless power transfer. The ET uses the acquired channels to concentrate the RF signal beam toward the target EH. Hence, the received energy at the EH improves by time. In some embodiments, the ET utilizes a spread spectrum signature as an Identifier (ID) for the target device. Also, in some embodiments, the target EH transmits the same spread spectrum signature, e.g. as a pilot signal, towards the ET for the purpose of channel estimation.

Embodiments of the solutions proposed herein may provide numerous advantages over the conventional solutions for WPT using radiative coupling and beamforming. For example, compared to many other solutions, embodiments disclosed herein may use two different frequencies for WPT and channel estimation and periodically switch between them to ensure continuous WPT. In addition, this may enable continuous channel tracking for concentrated beamforming toward the target EH. Hence, the received energy at the EH improves by time. This is beneficial since performing the task at the EH may require using power consuming operations such as analog to digital converters. Further, continuous channel tracking greatly increases the reliability of the EH devices during communication.

Embodiments disclosed herein may modulate the RF signal using a spread spectrum signature to include an ID of the target EH in the transmitted RF signal for WPT. Using a spread spectrum signature results in low power consumption at both the ET and the EH. In some embodiments, the signature of the EH is stored in the internal memory of the EH and, hence, much less power is required to read it when comparing it with the signature of the received RF signal.

FIG. 1 illustrates one example of a system 100 in which embodiments of the present disclosure may be implemented. Note that optional components are represented by dashed lines/boxes. As illustrated, the system 100 includes an ET 102 and one or more EHs 104. Specifically, in this example, the system 100 includes EH 104-1 and, optionally, one or more additional EHs 104-2 through 104-N.

In one example, the ET 102 may be, e.g., a radio access node (e.g., a base station) of a cellular communications network 106 (e.g., a 5GS) using a radio access link (e.g., an NR licensed band link) for wireless backhaul to a core network of the cellular communications network 106 and using an unlicensed spectrum radio access link (e.g., an NR Unlicensed (NR-U) link) for communicating with the EH(s) 104, once they are energized via WPT. For example, the ET 102 may be a stationary radio access node or a moving radio access node (e.g., a radio access node implemented in or attached to a flying apparatus such as, e.g., a drone). However, the ET 102 is not limited to being a radio access node. As another example, the ET 102 is a wireless device having a radio access link (e.g., a 5G NR radio access link) to the cellular communications network 106 (e.g., a 5GS). This wireless device may be a stationary wireless device (e.g., a stationary UE for, e.g., a 5GS) or a mobile wireless device (e.g., a UE that can be carried by a person, a UE implemented in or attached to a moving vehicle such as an automobile, or a UE implemented in or attached to a flying apparatus such as, e.g., a drone). In this case, the EH(s) 104 may, once energized, send data transmissions to the ET 102 via radio access links (e.g., NR-U Device-to-Device (D2D) links) or to a base station in the cellular communications network via, e.g., NR-U links.

The EH(s) 104 are preferably wireless devices (e.g., UEs, IoT devices, MTC devices, or the like). In some preferred embodiments, the EH(s) 104 are battery-less and operate solely based on energy collected via WPT (RF signal transmissions from the ET 102) using radiated coupling.

In some embodiments, the system 100 may also include a Control System (CS) 108. In some embodiments, the CS 108 may control the ET 102 to, e.g., energize a target EH 104 (e.g., the EH 104-1) in order for the target EH 104 to be able to perform a desired task (e.g., obtain data, such as a measurement(s), and send the obtained data, e.g., to the CS 108, via, in this example, the ET 102.

Now, the description will turn to some detailed embodiments of the present disclosure. In some embodiments, a dual-frequency cross-hopping scheme is provided for WPT toward the EH(s) 104, which may be battery-less devices. The goal is to efficiently transmit enough energy from the ET 102 to the EH 104 so that the EH 104 is able perform its task. For efficient energy transmission, the ET 102 performs effective beamforming of an RF signal toward the target EH 104. To perform effective beamforming, the ET 102 uses a channel estimate of the wireless channel between the ET 102 and the target EH 104. In some embodiments, the channel estimate is or is based on CSI for the wireless channel. The channel estimate is acquired by the ET 102 based on a signature transmission by the target EH 104. This whole process is referred to herein as a "bootstrap and track" process. In addition, this bootstrap and track process enables channel tracking between the ET 102 and the target EH 104. Each EH 104 can be among multiple other EHs 104. In the preferred embodiments, the EHs 104 are battery-less devices and, as such, are not initially able to transmit pilot signals toward the ET 102 for channel estimation. In addition, the EHs 104 initially will not be able to receive pilot signals from the ET 102 since they do not have power, i.e. they are passive devices.

During operation, the ET 102 transmits an RF signal toward the target EH 104 at two different frequencies, denoted here as $f_0$ and $f_1$. In some embodiments, the RF signal is a spread spectrum signal, and the RF signal is modulated by a spread spectrum signature which is used as an ID for the target EH 104. Using two frequencies enables simultaneous WPT and signature feedback reception at the ET 102. The ET 102 operates in an FDD mode by transmitting the RF signal toward the target EH 104 and receiving the signature feedback from the target EH 104 at the same time. In other words, seamless WPT and channel tracking is provided. In some embodiments, the frequencies $f_0$ and $f_1$ are in the same frequency band, e.g., an Industrial, Scientific, and Medical (ISM) band or an unlicensed frequency band, so that they can share the same antennas but are still sufficiently separated for easy filtering.

At each EH 104, passive energy harvesting circuitry (e.g., a rectenna) collects energy from the RF signal transmitted by the ET 102. As known to those of ordinary skill in the art, a rectenna is a device used to harvest energy from RF signals. When enough energy for signal processing is collected, the EH 104 extracts the signature of the RF signal. If the signature matches that of the EH 104, the EH 104 transmits the same signature (i.e., transmits an RF signal modulated with the same signature) back towards the ET 102 in the cross-frequency (i.e., the frequency other than the one on which the EH 104 collected energy and extracted the signature). The ET 102 uses the received signature to estimate the wireless channel (e.g., CSI) from the EH 104 toward itself. Hence, the signature received from the EH 104 is also used as a pilot signal. Assuming reciprocal channels, the ET 102 uses the channel estimate to update beamforming parameters (e.g., beamforming coefficients) used to beamform the RF signal when transmitting on the frequency in which the signature was received (i.e., the frequency to which the channel estimate applies). As described below in detail, by using this process in an iterative manner and hopping between the two frequencies, the accuracy of the beamforming of the RF signal used on each frequency is iteratively improved over time.

Figure 2:
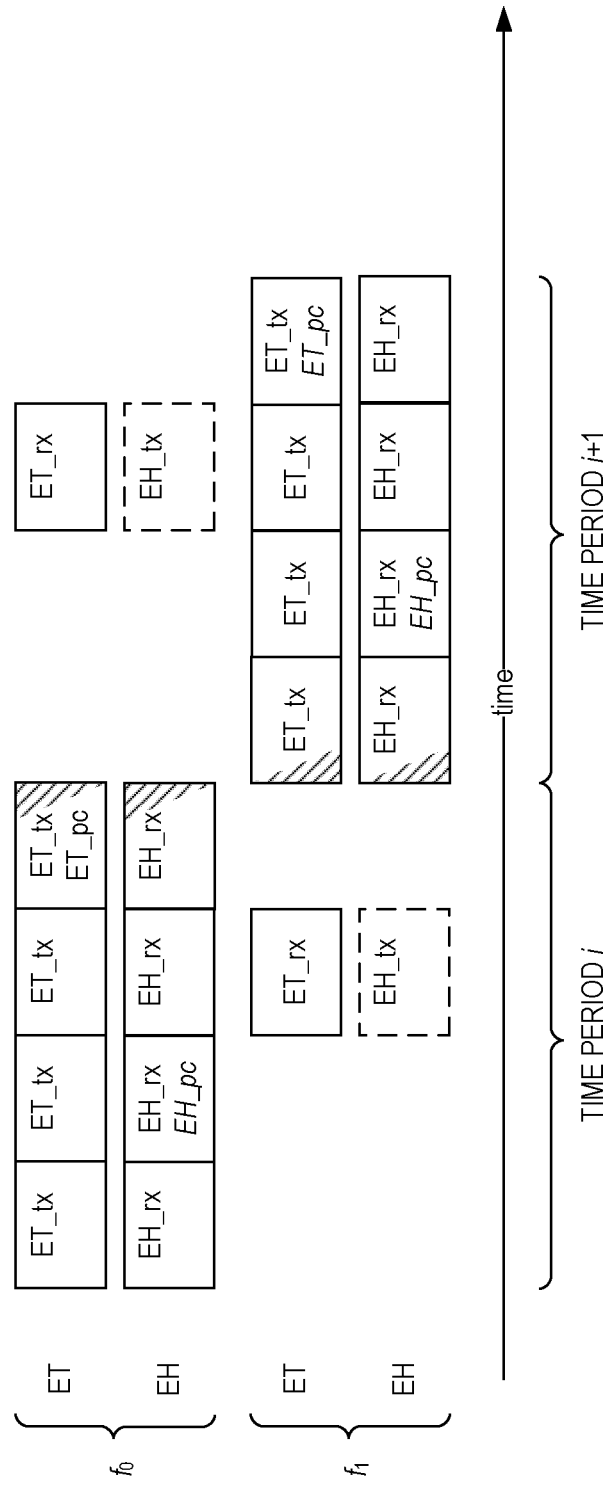
FIG. 2 illustrates one example of a cross-hopping scheme utilized by an Energy Transmitter (ET) and a target Energy Harvester (EH) in accordance with some embodiments of the present disclosure.

FIG. 2 illustrates one example of the cross-hopping scheme utilized by the ET 102 and the target EH 104 in accordance with some embodiments of the present disclosure. As illustrated, the ET 102 transmits the RF signal for WPT toward the target EH 104 in a combined FDD/TDD manner by alternating periodically between frequencies $f_0$ and $f_1$. Likewise, the target EH 104 transmits its signature back to the ET 102 for channel estimation in a combined FDD/TDD manner by alternating periodically between frequencies $f_0$ and $f_1$, as also illustrated in FIG. 2. The ET 102 and the target EH 104 alternate between these two frequencies in a synchronized and complementary fashion. In other words, when the ET 102 switches to $f_1$ for transmission of the RF signal towards the target EH 104, the target EH 104 switches to $f_0$ for transmission of its signature back to the ET 102. In addition, in some embodiments, the target EH 104 uses the frequency-hopping pattern for timing.

One cycle of the operation of the ET 102 and the target EH 104 is shown in FIG. 2. Specifically, in this example, the ET 102 and the target EH 104 operate as follows. During a first time period (denoted here as the i-th time period, or time period i), on frequency $f_0$, the ET 102 transmits the RF signal on $f_0$ during four time slots within the i-th time period, and the target EH 104 collects energy from the transmitted RF signal on $f_0$. Once the target EH 104 has collected enough energy, the target EH 104 extracts the signature from the transmitted RF signal, determines that the extracted signature matches its own signature, and therefore transmits its signature (e.g., an RF signal modulated with its signature) back to the ET 102 on $f_1$ during the i-th time period. In this example, the target EH 104 performs its processing to extract the signature of the RF signal received on $f_0$ and determines that the extracted signature matches its own signature in the second time slot during the i-th time period and transmits its signature on $f_1$ during the third time slot within the i-th time period. Then, at the ET 102, the ET 102 receives the signature from the target EH 104 and processes the received signature to obtain a channel estimate for the wireless channel for $f_1$. In this example, the processing by the target EH 104 to obtain the channel estimate for $f_1$ occurs in the fourth and final time slot within the i-th time period.

Then, during a second time period (denoted here as the (i+1)-th time period, or time period i+1), the ET 102 switches to $f_1$ and uses the channel estimate for $f_1$ to transmit a beamformed version of the RF signal on $f_1$ during four time slots within the (i+1)-th time period, and the target EH 104 collects energy from the transmitted RF signal on $f_1$. Again, once the target EH 104 has collected enough energy, the target EH 104 extracts the signature from the transmitted RF signal received on $f_1$, determines that the extracted signature matches its own signature, and therefore transmits its signature (e.g., an RF signal modulated with its signature) back to the ET 102 on $f_0$. In this example, the target EH 104 performs its processing to extract the signature of the RF signal received on $f_1$ and determines that the extracted signature matches its own signature in the second time slot during the (i+1)-th time period and transmits its signature on $f_0$ during the third time slot within the (i+1)-th time period. Then, at the ET 102, the ET 102 receives the signature from the target EH 104 and processes the received signature to obtain a channel estimate for the wireless channel for $f_0$. In this example, the processing by the target EH 104 to obtain the channel estimate for $f_0$ occurs in the fourth and final time slot within the (i+1)-th time period.

While not illustrated, after the ET 102 has transmitted the RF signal in the desired number of time slots in the (i+1)-th time period, the ET 102 then switches back to $f_0$ and transmits a beamformed version of the RF signal on $f_0$ using the channel estimate for $f_0$, and the process continues until the target EH 104 has collected enough energy to perform its desired task. The process continues such that a number of these iterations (referred to herein as "channel estimation iterations") are performed. For each frequency, each channel estimation iteration between the ET 102 and the target EH 104 for that frequency results in a better beamformed RF signal toward the target EH 104 (i.e., beamforming that is more focused on the target EH 104) for that frequency. The iterative approach is continued until the target EH 104 has enough power to perform its desired task, e.g. measurement in the environment, process the data, and send the data to the ET 102.

Figure 3:
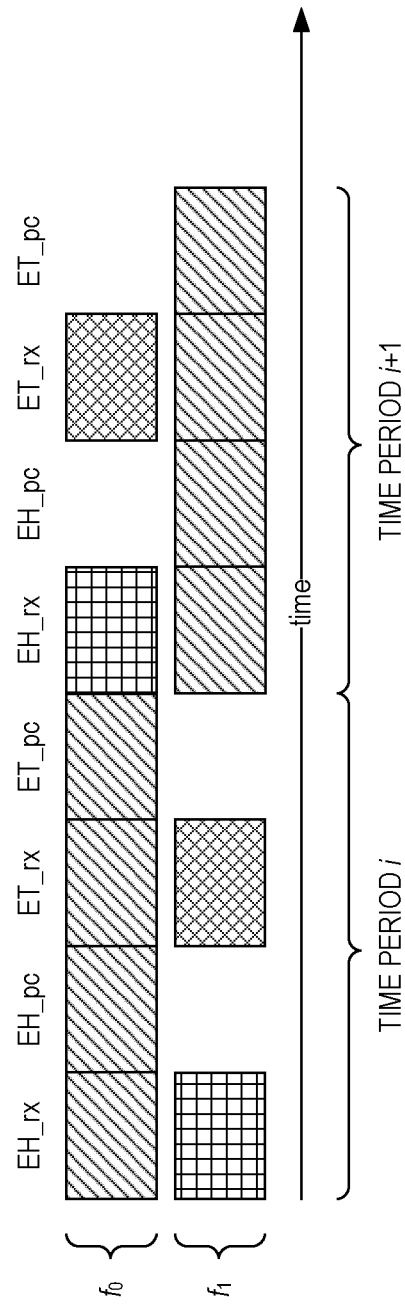
FIG. 3 illustrates one example of a cross-hopping scheme utilized by an ET and a target EH in accordance with some embodiments of the present disclosure.
Figure 4C:
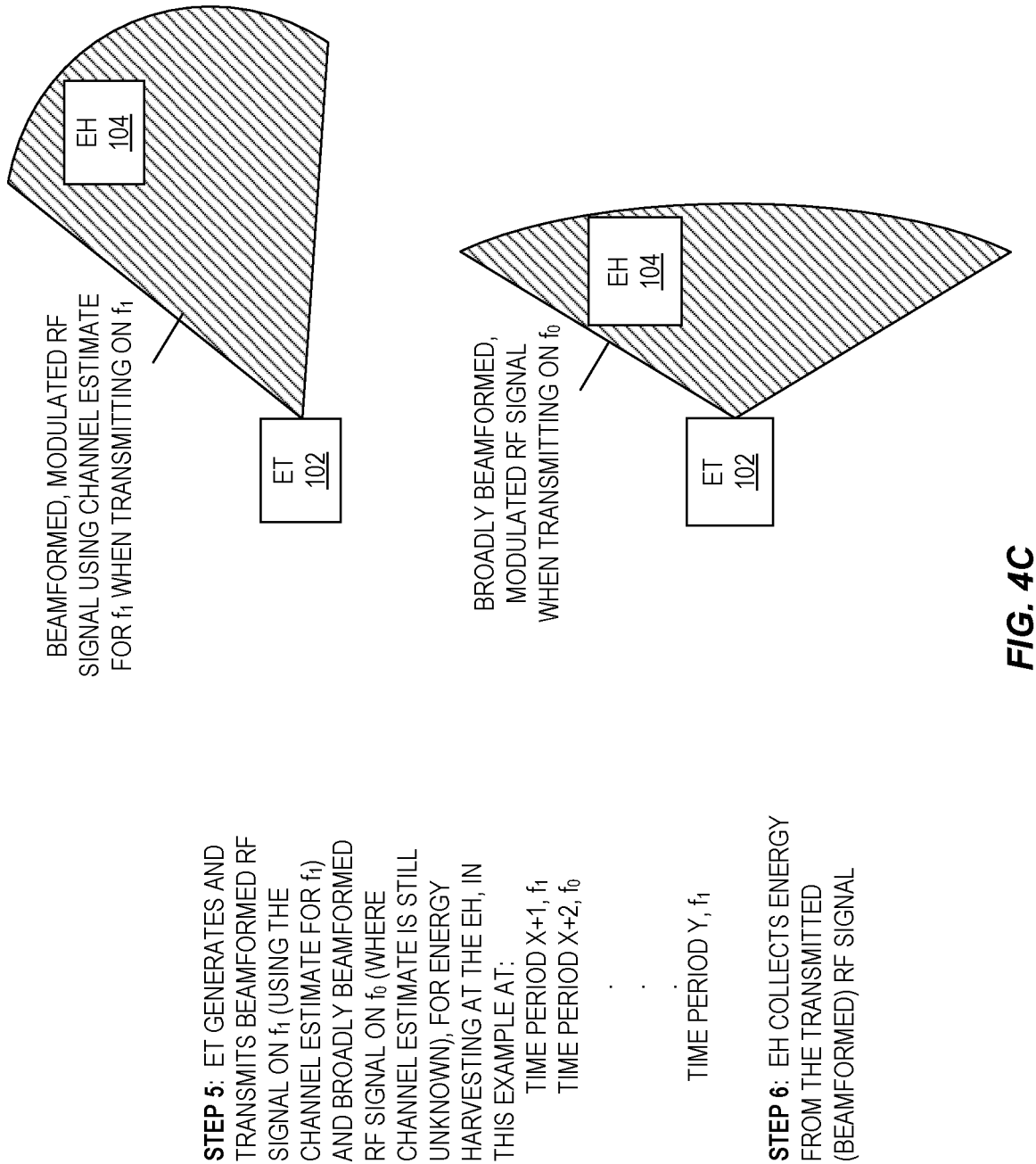
Figure 4F:
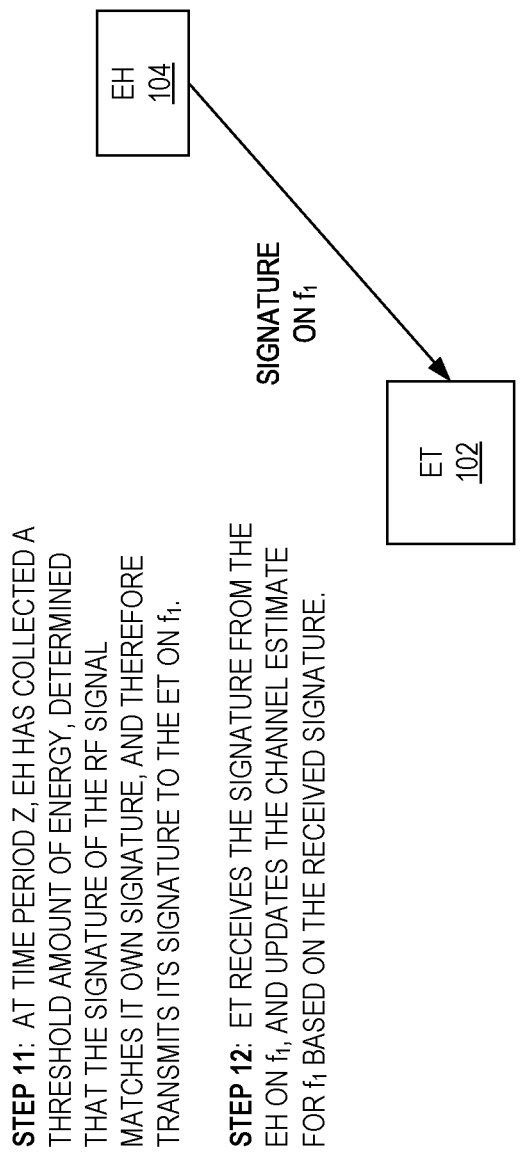
Figure 4G:
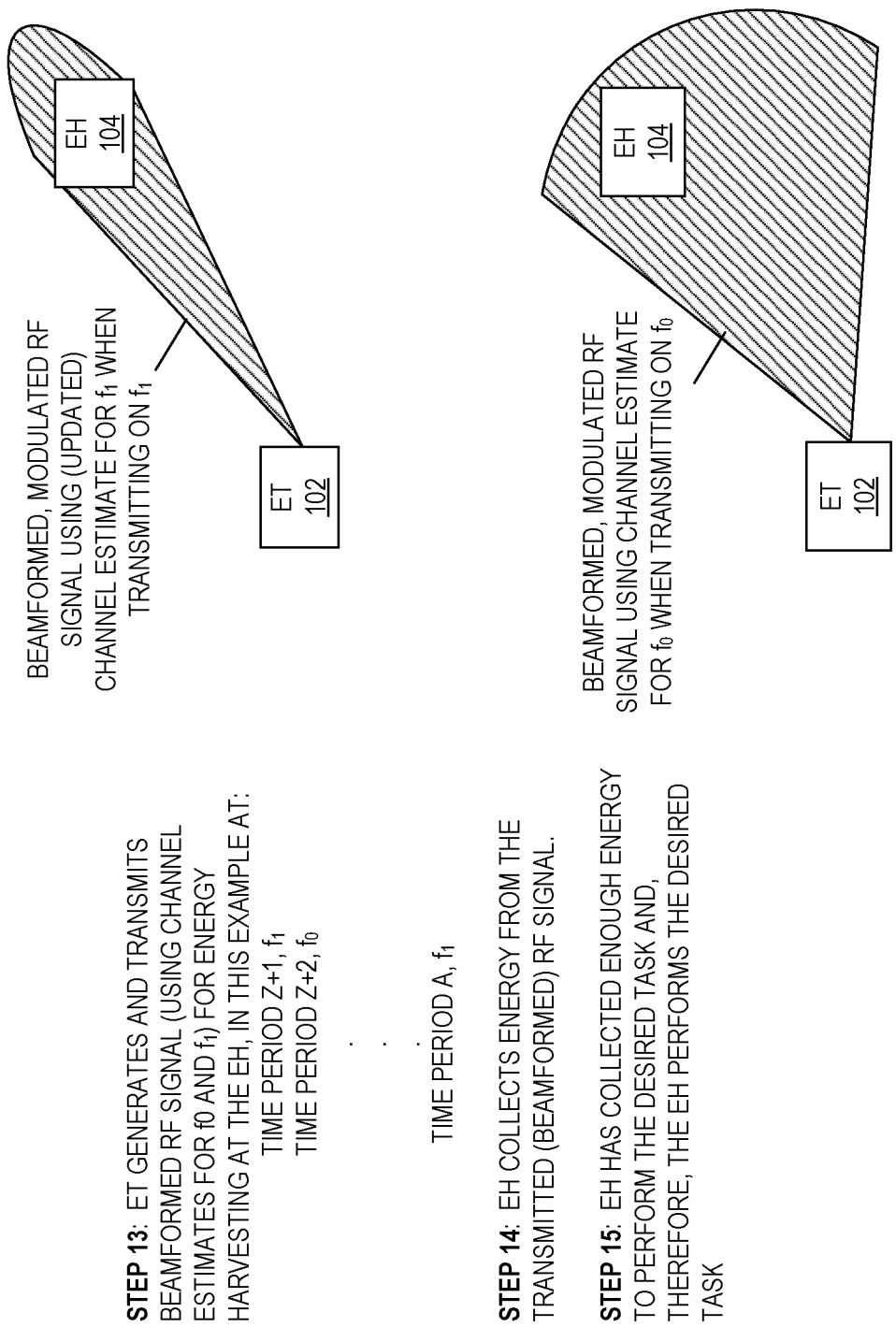

FIG. 3 illustrates another example of the cross-hopping scheme utilized by the ET 102 and the target EH 104 in accordance with some embodiments of the present disclosure. This illustration is the same as that in FIG. 2, but uses a slightly different format, and further includes an optional feature in which the ET 102 may transmit the RF signal on both $f_0$ and $f_1$ during the first time slot of each time period.

FIGS. 4A through 4G illustrate the operation of the ET 102 and the target EH 104 in accordance with one example embodiment of the present disclosure. The steps of the process are as follows:

Step 1: At the ET 102, the RF signal from the ET 102 is modulated by a signature of the target EH 104 and the modulated RF signal is transmitted by the ET 102 over one or more time periods, switching between frequencies $f_0$ and $f_1$. In this example, the modulated RF signal is initially broadly beamformed since the ET 102 does not yet know a channel estimate for the wireless channel between the ET 102 and the target EH 104. This broadly beamformed RF signal may be directed towards an estimated location of the target EH 104, where this estimated location may be obtained using any suitable location estimation scheme. In this example, the ET 102 transmits the broadly beamformed, modulated RF signal during time period 1 (i.e., time period i=1) on $f_0$, during time period 2 on $f_1$ ..., and during time period X on $f_0$. Multiple time periods may be needed to allow the target EH 104 to collect sufficient energy for it to be able to extract the signature from the RF signal, determine whether the extracted signature matches its own signature, and, if so, transmit its signature back to the ET 102. However, in some embodiments, this may only require a single time period, in which case step 1 would only include transmitting the broadly beamformed, modulated RF signal during time period 1 on $f_0$. It should also be noted that, in some embodiments, the ET 102 may first transmit the broadly beamformed modulated RF signal using a first transmit power (e.g., a high transmit power), e.g., in order to reduce the time for initial wakeup of the EHs 104, and then successively reduce the transmit power throughout the process as beamforming accuracy is improved.

Step 2: The target EH 104 collects energy (e.g., using its rectenna) from the RF signal transmitted by the ET 102.

Step 3: At time period X, the target EH 104 has collected a sufficient amount of energy (e.g., a predefined or preconfigured threshold amount of energy) to enable the target EH 104 to extract the signature from the received RF signal and, if there is a match, transmit its signature back to the ET 102. In this example, the target EH 104 determines that there is a match between the signature extracted from the received RF signal on $f_0$ and its own signature and, therefore, transmits its signature to the ET 102 during time period X on $f_1$ (i.e., the frequency other than the one on which the matching signature was extracted). Note that the transmit power of the signature transmitted by the target EH 104 may, at this point, be very low, e.g., due to power constraints at the target EH 104.

Step 4: During time period X, the ET 102 receives the signature transmitted by the target EH 104 via its antenna array and uses the received signature to compute a channel estimate for the wireless channel between the ET 102 and the target EH 104 on $f_1$.

Step 5: Using the channel estimate for $f_1$, the ET 102 beamforms the modulated RF signal and transmits the beamformed, modulated RF signal towards the target EH 104 during time period X+1 on $f_1$. By using the channel estimate for $f_1$, the beamforming used in step 5 when transmitting the RF signal on $f_1$ is more focused on the target EH 104 than the broad beamforming used in step 1. In this example, the ET 102 transmits the modulated RF signal in one or more time periods, switching between $f_1$ and $f_0$. At this point, a channel estimate for $f_1$ is known, but a channel estimate for $f_0$ is still unknown. Thus, when transmitting on $f_1$, the modulated RF signal is beamformed using the channel estimate for $f_1$, but, at this point when transmitting on $f_0$, the modulated RF signal is still broadly beamformed. In this example, the ET 102 transmits the beamformed, modulated RF signal during time period X+1 on $f_1$ using the channel estimate for $f_1$, transmits the broadly beamformed, modulated RF signal during time period X+2 on $f_0$, and continues to switch between the two frequencies until, in this example, the ET 102 transmits the broadly beamformed, modulated RF signal during time period Y on $f_1$. Multiple time periods may be needed to allow the target EH 104 to collect sufficient energy for it to be able to again extract the signature from the RF signal, determine whether the extracted signature matches its own signature, and, if so, transmit its signature back to the ET 102. However, in some embodiments, this may only require a single time period, in which case step 5 would only include transmitting the broadly beamformed, modulated RF signal during time period X+1 on $f_1$.

Step 6: The target EH 104 collects energy from the RF signal transmitted by the ET 102.

Step 7: At time period Y, the target EH 104 has collected a sufficient amount of energy (e.g., a predefined or preconfigured threshold amount of energy) to enable the target EH 104 to extract the signature from the received RF signal and, if there is a match, transmit its signature back to the ET 102 on $f_0$. In this example, the target EH 104 determines that there is a match between the signature extracted from the received RF signal and its own signature and, therefore, transmits its signature to the ET 102 during time period Y on $f_0$ (i.e., the frequency other than the one on which the matching signature was extracted).

Step 8: During time period Y, the ET 102 receives the signature transmitted by the target EH 104 on $f_0$ and uses the received signature to compute a channel estimate for the wireless channel between the ET 102 and the target EH 104 on $f_0$.

Step 9: Using the channel estimate for $f_0$, the ET 102 beamforms the modulated RF signal using the channel estimate for $f_0$ and transmits the beamformed, modulated RF signal towards the target EH 104 during time period Y+1 on $f_0$. By using the channel estimate for $f_0$, the beamforming used in step 9 is more focused on the target EH 104 than the broadly beamformed RF signal transmitted on $f_0$ in step 5. At this point, channel estimates are known for both $f_0$ and $f_1$. Thus, when transmitting on $f_0$, the modulated RF signal is beamformed using the channel estimate for $f_0$, and, when transmitting on $f_1$, the modulated RF signal is beamformed using the channel estimate for $f_1$. In this example, the ET 102 transmits beamformed, modulated RF signals in one or more time periods, switching between $f_0$ and $f_1$. In this example, the ET 102 transmits the beamformed, modulated RF signal during time period Y+1 on $f_0$ using the channel estimate for $f_0$, transmits the beamformed, modulated RF signal during time period Y+2 on $f_1$ using the channel estimate for $f_1$, . . . , and continues to switch between the two frequencies until, in this example, the ET 102 transmits the beamformed, modulated RF signal during time period Z on $f_0$ using the channel estimate for $f_0$. Multiple time periods may be needed to allow the target EH 104 to collect sufficient energy for it to be able to again extract the signature from the RF signal, determine whether the extracted signature matches its own signature, and, if so, transmit its signature back to the ET 102. However, in some embodiments, this may only require a single time period, in which case step 9 would only include transmitting the broadly beamformed, modulated RF signal during time period Y+1 on $f_0$.

Step 10: The target EH 104 collects energy from the RF signal transmitted by the ET 102.

Step 11: At time period Z, the target EH 104 has collected a sufficient amount of energy (e.g., a predefined or preconfigured threshold amount of energy) to enable the target EH 104 to extract the signature from the received RF signal and, if there is a match, transmit its signature back to the ET 102 on $f_1$. In this example, the target EH 104 determines that there is a match between the signature extracted from the received RF signal and its own signature and, therefore, transmits its signature to the ET 102 during time period Z on $f_1$ (i.e., the frequency other than the one on which the matching signature was extracted).

Step 12: During time period Z, the ET 102 receives the signature transmitted by the target EH 104 on $f_1$ and uses the received signature to update the channel estimate for the wireless channel between the ET 102 and the target EH 104 on $f_1$.

Step 13: The ET 102 beamforms the modulated RF signal using the updated channel estimate for $f_1$ and transmits the beamformed, modulated RF signal towards the target EH 104 during time period Z+1 on $f_1$. By using the new/updated channel estimate for $f_1$, the beamforming used in step 13 when transmitting on $f_1$ is more focused on the target EH 104 than the beamforming used for $f_1$ in steps 5 and 9. At this point, channel estimates are known for both $f_0$ and $f_1$. Thus, when transmitting on $f_0$, the modulated RF signal is beamformed using the channel estimate for $f_0$, and, when transmitting on $f_1$, the modulated RF signal is beamformed using the (updated/new) channel estimate for $f_1$. In this example, the ET 102 transmits this beamformed, modulated RF signal in one or more time periods, switching between $f_0$ and $f_1$. In this example, the ET 102 transmits the beamformed, modulated RF signal during time period Z+1 on $f_1$ using the (updated/new) channel estimate for $f_1$, transmits the beamformed, modulated RF signal during time period Z+2 on $f_0$ using the channel estimate for $f_0$, and continues to switch between the two frequencies until, in this example, the ET 102 transmits the beamformed, modulated RF signal during time period A on $f_1$ using the (updated/new) channel estimate for $f_1$. Multiple time periods may be needed to allow the target EH 104 to collect sufficient energy for it to be able to again extract the signature from the RF signal, determine whether the extracted signature matches its own signature, and, if so, transmit its signature back to the ET 102. However, in some embodiments, this may only require a single time period, in which case step 13 would only include transmitting the broadly beamformed, modulated RF signal during time period Z+1 on $f_1$.

Step 14: The target EH 104 collects energy from the RF signal transmitted by the ET 102.

Step 15: At time period A (or some time period in the range of and including time period Z+1 to time period Z), the target EH 104 has collected a sufficient amount of energy (e.g., a predefined or preconfigured threshold amount of energy) to perform a desired task and, therefore, the target EH 104 performs the desired task.

In other words, in some embodiments, the dual-frequency cross-hopping WPT procedure disclosed herein is as follows:

a) At the ET 102, the RF signal is modulated by a signature sequence of the target EH 104.

b) The ET 102 transmits the RF signal interchangeably between frequencies $f_0$ and $f_1$ by broadly beamforming it toward the estimated location of the target EH 104. If a channel estimate (e.g., CSI) for the wireless channel between the ET 102 and the target EH 104 is available for the transmission frequency, the ET 102 uses the channel estimate to beamform the RF signal when transmitting on that frequency. The frequency switching happens when the number of allocated time slots are finished. The switching is modeled by setting i=0, setting the transmission to frequency $f_{mod(i,2)}$, and setting i=i+1 when the transmission period at frequency $f_{mod(i,2)}$ ends. In some embodiments, a fixed and equal number of time slots are allocated when transmitting in each frequency. An example of the time slot allocation and frequency switching are illustrated in FIGS. 2 and 3.

c) The target EH 104 (as well as any other EH(s) that are in the field of the radiated RF signal) starts collecting energy from the transmitted RF signal.

d) When the target EH 104 (as well as any other EH(s) that are in the field of the radiated RF signal) has collected enough energy, it starts processing the received RF signal to extract the signature.

e) If the extracted signature matches the signature of the target EH 104, the target EH 104 transmits its signature back to the ET 102 at frequency $f_{mod(i+1,2)}$. The strength of this signal depends on the beamforming concentration of the ET 102 when sending the RF signal towards the target EH 104.

f) The ET 102 receives the signature signal transmitted by the target EH 104 and estimates the wireless channel at frequency $f_{mod(i+1,2)}$ g) The ET 102 uses the estimated channel to improve the beamforming and concentrate the RF signal when transmitting at frequency $f_{mod(i+1,2)}$.

h) Repeat steps (b) to (g) until the energy of the target EH 104 reaches the level that it can perform its desired task.

Figure 5:
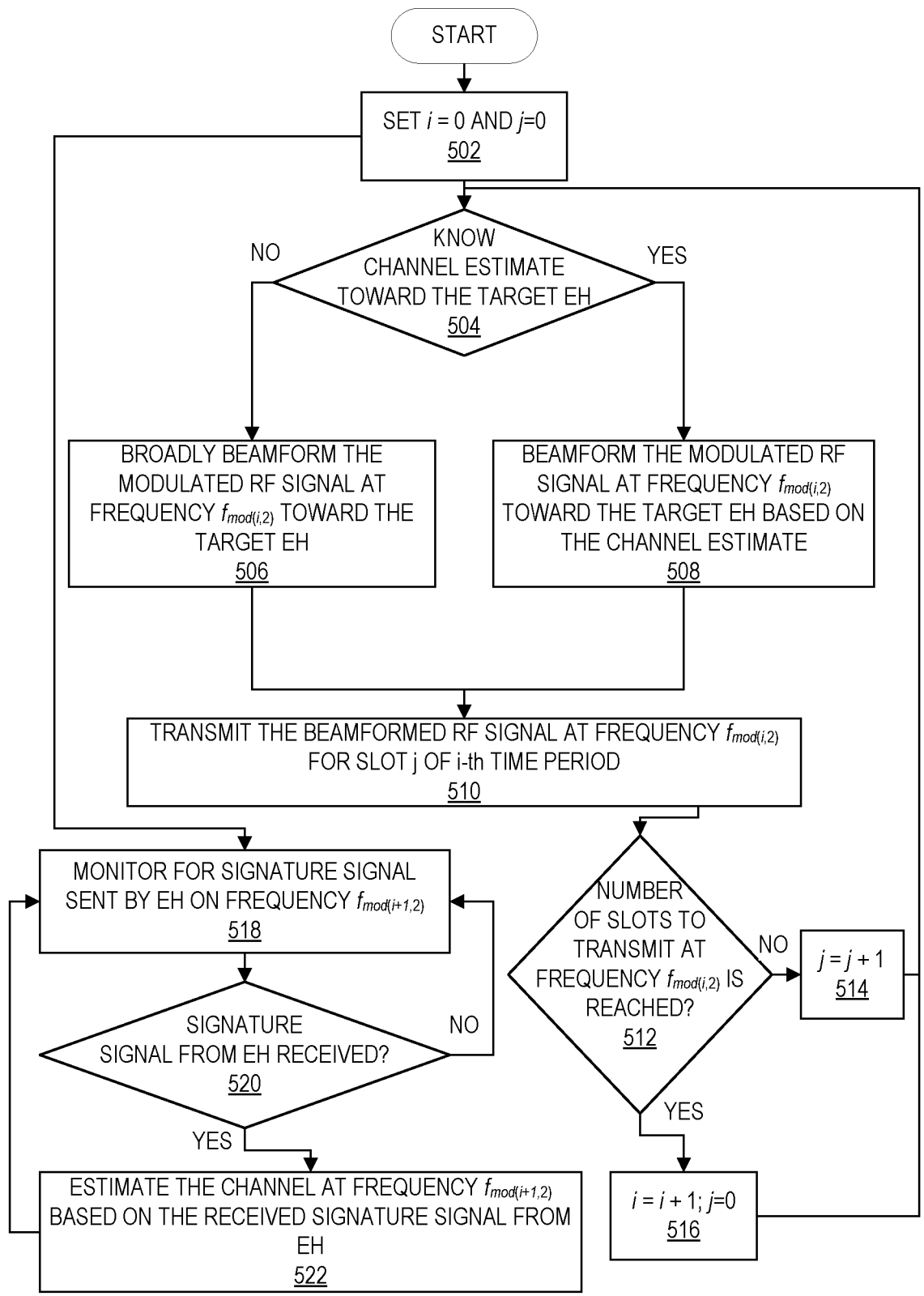
FIG. 5 is a flow chart that illustrates the operation of an ET in accordance with one embodiment of the present disclosure.
Figure 6:
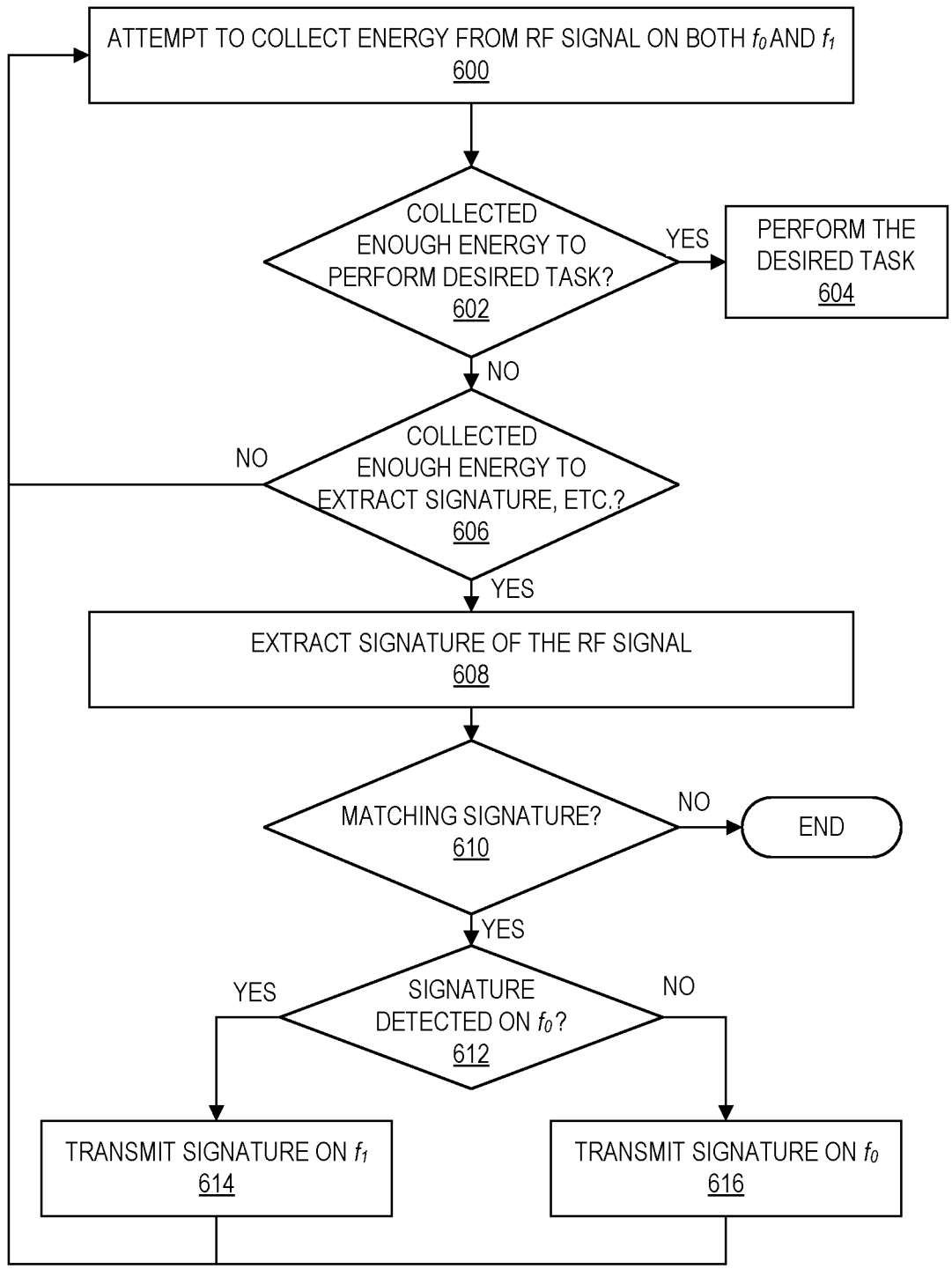
FIG. 6 is a flow chart that illustrates the operation of an EH in accordance with one embodiment of the present disclosure.

FIGS. 5 and 6 are flow charts that illustrate the dual-frequency cross-hopping WPT procedure in more detail in accordance with one embodiment of the present disclosure. In particular, FIG. 5 is a flow chart that illustrates the operation of the ET 102 to perform the dual-frequency cross-hopping WPT procedure in accordance with one embodiment of the present disclosure. For each time period ($TP_i$) of a set of time periods ($\{TP_i\}_{i=0,1,\ldots,I-1}$), the ET 102 transmits either a broadly beamformed/non-beamformed version of the modulated RF signal or a beamformed version of the RF signal, depending on whether a channel estimate is known for the respective frequency, for each time slot ($TS_{i,j}$) of a set of time slots ($\{TS_{i,j}\}_{j=0,1,\ldots,J-1}$) within the time period ($TP_i$). Note that I is a positive integer that is greater than or equal to 2 and, e.g., less than or equal to some predefined maximum number of time periods, and J is a positive integer that is greater than or equal to 1 and, e.g., less than or equal to some predefined maximum number of slots for the time period ($TP_i$).

More specifically, as illustrated, the ET 102 sets a time period counter i to 0 and a time slot counter j to 0 (step 502).

The ET 102 determines whether it knows a channel estimate (e.g., CSI) for the wireless channel between the ET 102 and the target EH 104 (step 504). In other words, the ET 102 determines whether a channel estimate (e.g., CSI) for the wireless channel is available or has been obtained. In this embodiment, separate channel estimates are obtained for the two frequencies $f_0$ and $f_1$. As such, in step 504, the ET 102 determines whether a channel estimate is known for frequency $f_{mod(i,2)}$. However, in some alternative embodiments, a single channel estimate is obtained that is applicable for both $f_0$ and $f_1$. As such, in step 504, the ET 102 determines whether their generally applicable channel estimate is known.

If the channel estimate is not known, in this example, the ET 102 generates a broadly beamformed RF signal $S_T(i,j)$ at frequency $f_{mod(i,2)}$ towards the target EH 104 (step 506). The RF signal $S_T(i,j)$ is generated such that it is modulated by the signature of the target EH 104. Alternatively, the RF signal $S_T(i,j)$ may not be beamformed at all (i.e., be a "non-beamformed" RF signal). Conversely, if the channel estimate for the wireless channel is known, the ET 102 uses the channel estimate to generate a beamformed RF signal $S_T(i,j)$ at frequency $f_{mod(i,2)}$ towards the target EH 104 (step 508). Again, the RF signal $S_T(i,j)$ is modulated by the signature of the target EH 104. Then, whether proceeding from step 506 or step 508, the ET 102 transmits the broadly beamformed or beamformed RF signal $S_T(i,j)$ during the time slot $TS_{i,j}$ of the time period $TP_i$ at frequency $f_{mod(i,2)}$ towards the target EH 104 (step 510).

The ET 102 determines whether the number of time slots to transmit at frequency $f_{mod(i,2)}$ is reached (i.e., determines whether j is equal to J−1, where J is the number of time slots to be transmitted at frequency $f_{mod(i,2)}$) (step 512). Note that J is a positive integer that is greater than or equal to 1 and, e.g., less than or equal to some predefined maximum number of slots. If not, the time slot counter j is incremented (step 514) and the process returns to step 504. If the number of time slots to transmit at frequency $f_{mod(i,2)}$ is reached, the time period counter i is incremented and the time slot counter j is reset to zero (step 516), and then the process returns to step 504 and is repeated. In this manner, the ET 102 transmits the modulated RF signal towards the target EH 104 using channel estimate (e.g., CSI) based beamforming while switching, or hopping, between the two frequencies $f_0$ and $f_1$.

In addition, proceeding from step 502, during each time period $TP_i$, the ET 102 also monitors for a signature signal (sometimes denoted herein as "$S_R$" or "$S_R(i)$") transmitted by the target EH 104 on frequency $f_{mod(i+1,2)}$ (step 518) and determines whether a signature signal from the target EH 104 has been received (step 520). If not, the ET 102 continues to monitor for the signature signal from the target EH 104 by returning to step 518. If the signature signal from the target EH 104 is received (step 520, YES), the ET 102 estimates the wireless channel at frequency $f_{mod(i+1,2)}$ based on the received signature signal from the target EH 104 (step 522) and the process returns to step 518 to continue monitoring. At this point, the channel estimate at frequency $f_{mod(i+1,2)}$ is "known" such that the result of the decision in step 504 will thereafter be "YES". Note that, as the time period counter/is changed by step 516, this will also change the frequency being monitored in step 518.

FIG. 6 is a flow chart that illustrates the operation of the EH 104 to perform the dual-frequency cross-hopping WPT procedure in accordance with one embodiment of the present disclosure. As illustrated, the EH 104 attempts to collect energy from the modulated RF signal transmitted by the ET 102 (step 600). In this embodiment, the EH 104 may not be aware the frequency on which the ET 102 is currently transmitting and, as such, attempts to collect energy on both $f_0$ and $f_1$. The EH 104 determines whether a sufficient amount of energy has been collected to perform a desired task (step 602). In other words, the EH 104 determines whether a predefined or preconfigured threshold amount of energy needed to perform the desired task has been collected. If so, the EH 104 performs the desired task (step 604).

If a sufficient amount of energy to perform the desired task has not yet been collected, the EH 104 determines whether a sufficient amount of energy has been collected to extract the signature from the RF signal, compare the extracted signature to that of the EH 104, and transmit its signature (step 606). For example, the EH 104 determines this by determining whether the amount of energy collected is greater than a predefined or predetermined threshold amount of energy to extract the signature from the RF signal, compare the extracted signature to that of the EH 104, and transmit its signature. If not, the process returns to step 600 and is repeated.

However, if the EH 104 has collected a sufficient amount of energy to extract the signature from the RF signal, compare the extracted signature to that of the EH 104, and transmit its signature, the EH 104 extracts the signature from the RF signal (step 608). The EH 104 compares the extracted signature to its own signature to determine whether there is a match (step 610). If not, the process may end or, alternatively, return to step 600. If there is a match, the EH 104 determines whether the matching signature was detected on $f_0$ (step 612). If so, the EH 104 transmits is signature on $f_1$ (step 614). If not, the EH 104 transmits its signature on $f_0$ (step 616).

Figure 7:
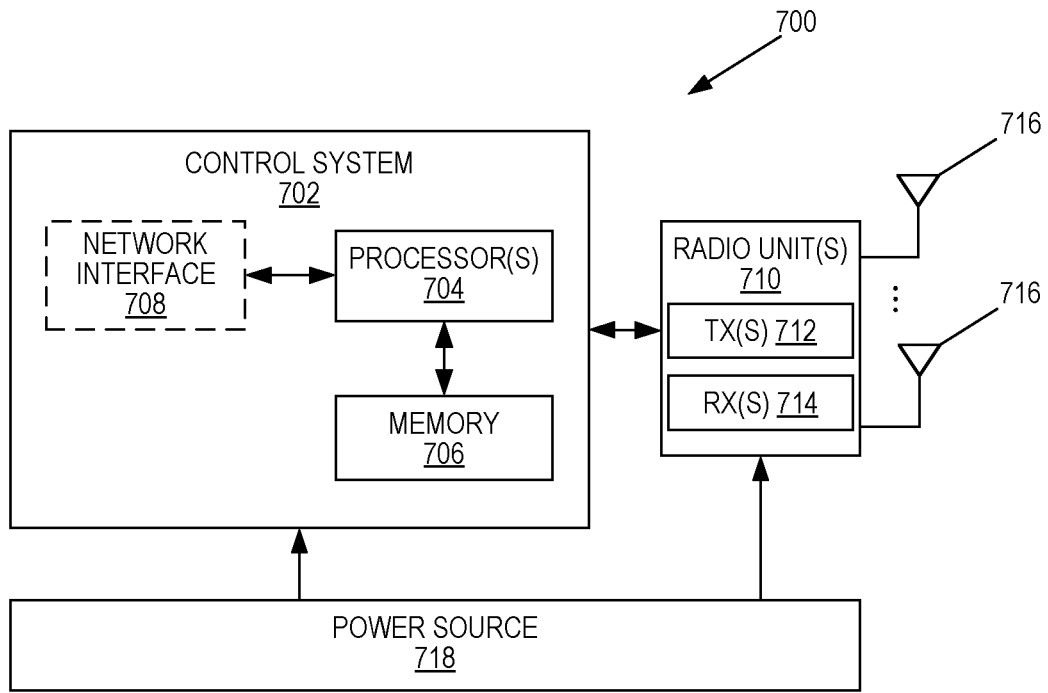
FIG. 7 is a schematic block diagram of one example of an ET according to some embodiments of the present disclosure.

FIG. 7 is a schematic block diagram of an example embodiment of an ET 700 according to some embodiments of the present disclosure. The ET 700 may be an example embodiment of the ET 102 described above. As illustrated, the ET 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and optionally a network interface 708. The one or more processors 704 are also referred to herein as processing circuitry. In addition, the ET 700 may include one or more radio units 710 that each includes one or more transmitters 712 and one or more receivers 714 coupled to multiple antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antennas 716 are integrated together with the control system 702. The ET 700 also includes a power source 718, which may be, for example, a battery, a power supply including an Alternating Current (AC)/Direct Current (DC) converter that connects to an external power system (e.g., the power grid) via a wired connection, or the like.

The one or more processors 704 operate to provide one or more functions of an ET 700 as described herein (e.g., one or more functions of the ET 102 described herein). In some embodiments, the function(s) are implemented in software that is stored, e.g., in the memory 706 and executed by the one or more processors 704.

In regard to beamforming, the ET 700 may perform digital beamforming (e.g., in the processing circuitry 704), analog beamforming (e.g., via amplifiers and phase shifters in the transmitters 712, which are configured, e.g., by the processing circuitry 704, to provide the desired beamforming, or hybrid beamforming (i.e., a combination of digital and analog beamforming). Note that beamforming and mechanisms to perform beamforming are well-known to those of ordinary skill in the art and, as such, are not described herein.

In some embodiments, a computer program including instructions which, when executed by at least one processor, causes the at least one processor to carry out the functionality of the ET 102 or 700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
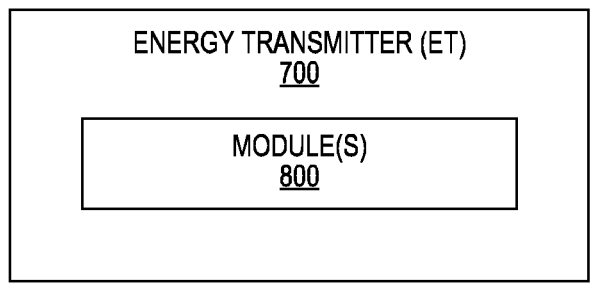
FIG. 8 is a schematic block diagram of another example of an ET according to some embodiments of the present disclosure.

FIG. 8 is a schematic block diagram of the ET 700 according to some other embodiments of the present disclosure. The ET 700 includes one or more modules 800, each of which is implemented in software. The module(s) 800 provide the functionality of the ET 700 described herein (e.g., one or more functions of the ET 102 described herein). For example, the modules 800 may include one or more modules the perform, e.g., the steps of FIGS. 4A-4G (e.g., a transmitting module that performs the functions of step 1 of FIG. 4A, a receiving module that performs the functions of step 4 of FIG. 4B, etc.) or the steps of FIG. 5 (e.g., a modulating module that performs the functions of step 500, a setting module that performs the functions of step 502, a determining module that performs the functions of step 504, etc.).

Figure 9:
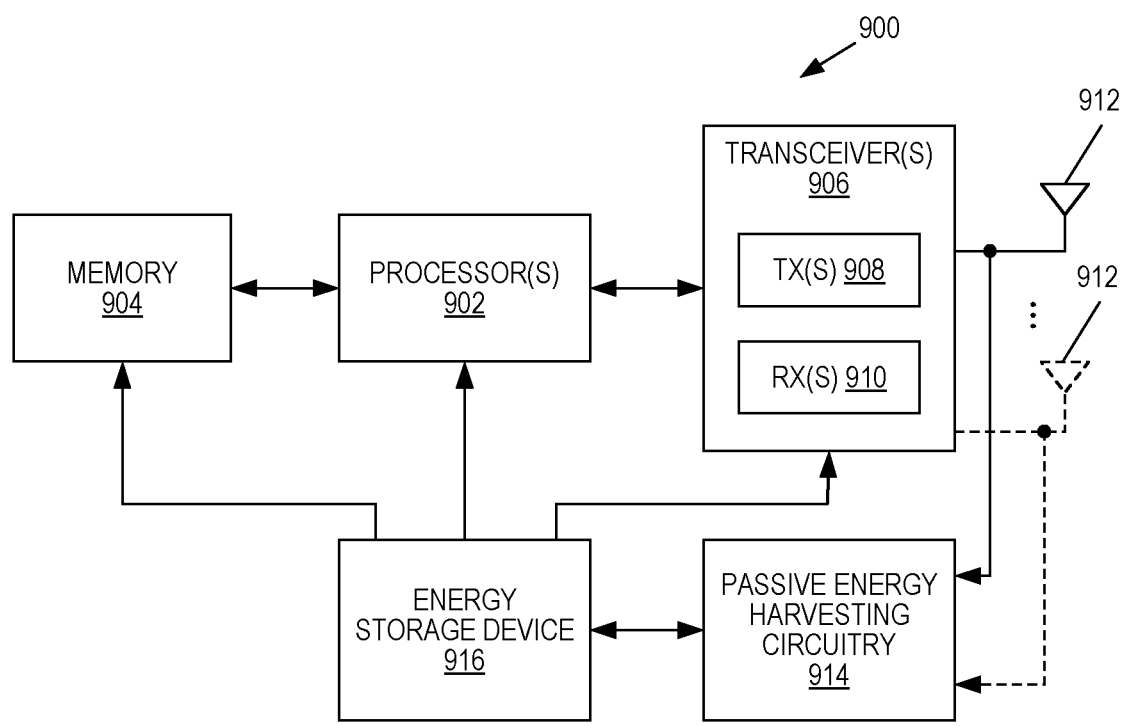
FIG. 9 is a schematic block diagram of a wireless communication device, which operates as an EH, according to one example of some embodiments of the present disclosure.

FIG. 9 is a schematic block diagram of a wireless communication device 900 according to some embodiments of the present disclosure. The passive wireless communication device 900 is one example of the EH 104. As illustrated, the wireless communication device 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. Note that, in some embodiments, multiple antennas may be used for receiving but only one antenna may be used for transmission (at least during power harvesting). The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. The wireless communication device 900 also includes passive energy harvesting circuitry 914 (e.g., one or more rectennas, which are also referred to as "rectifying antennas") and an energy storage device 916. Note that, while not illustrated, the wireless communication device 900 includes one or more Analog to Digital Converters (ADCs) for converting received analogy signals/information to the digital domain and likewise include one or more Digital to Analog Converters (DACs) for converting generated digital signals/information to the analog domain for transmission.

In some embodiments, the functionality of the EH 104 described above may be fully or partially implemented in software that is, e.g., stored in the memory 904 and executed by the processor(s) 902. Note that the wireless communication device 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, the passive energy harvesting circuitry 914 collects energy from the RF signal transmitted by the ET 102 in accordance with the dual-frequency cross-hopping WPT procedure described herein. The collected energy is stored in the energy storage device 916, which may be, for example, a capacitor or some device having capacitive properties, a battery, or the like. Once a sufficient amount of energy has been collected, the wireless communication device 900 (e.g., the processing circuitry 902) extracts the signature from the received RF signal from the ET 102 and determines whether the extracted signature matches a local copy of the signature of the wireless communication device 900, which may be stored locally, e.g., in the memory 904. If so, the wireless communication device 900 transmits its signature, as described above. Once a sufficient amount of energy to perform a desired task has been collected and stored in the energy storage device 916, the wireless communication device 900 performs the desired task.

In some embodiments, a computer program including instructions which, when executed by at least one processor, causes the at least one processor to carry out the functionality of the EH 104 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
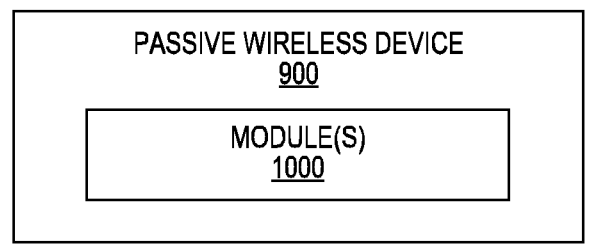
FIG. 10 is a schematic block diagram of a wireless communication device, which operates as an EH, according to another example of some embodiments of the present disclosure.

FIG. 10 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 900, as the EH 104, in accordance with the embodiments described herein. For example, the modules 1000 may include one or more modules that provide the functionality of the EH 104 as described above with respect to FIGS. 4A-4G (e.g., a collecting module that performs the functionality of step 2 of FIG. 4A, a processing and transmitting module that operates to perform the functions of step 3 of FIG. 4B, etc.) or one or more modules that provide the functionality of the EH 104 as described above with respect to FIG. 6 (e.g., a collecting module that performs the functions of step 600, a determining module that performs the functions of step 602, a determining module that performs the functions of step 606, an extracting module that performs the functions of step 608, etc.).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GS Fifth Generation System
AC Alternating Current
ADC Analog to Digital Converter
ASIC Application Specific Integrated Circuit
CPU Central Processing Unit
CS Control System
CSI Channel State Information
D2D Device-to-Device
DAC Digital to Analog Converter
DC Direct Current
DSP Digital Signal Processor
DSSS Direct Sequence Spread Spectrum
eNB Enhanced or Evolved Node B
EH Energy Harvester
ET Energy Transmitter
FDD Frequency Division Duplexing
FPGA Field Programmable Gate Array
gNB New Radio Base Station
gNB-DU New Radio Base Station Distributed Unit
ID Identifier
IoT Internet of Things
ISM Industrial, Scientific, and Medical
LTE Long Term Evolution
MTC Machine Type Communication
NR New Radio
NR-U New Radio Unlicensed
PC Personal Computer
RAM Random Access Memory
RAN Radio Access Network
RF Radio Frequency
ROM Read Only Memory
RSSI Received Signal Strength Indicator
TDD Time Division Duplexing
UE User Equipment
WPT Wireless Power Transfer Those skilled in the art will recognize improvements and modifications to the embodiments of the present disclosure. All such improvements and modifications are considered within the scope of the concepts disclosed herein.

REFERENCES

[1] R. Malik, P. Tinnakornsrisuphap and B. P. Mohanty, "WIRELESS ENERGY TRANSMISSION". USA Patent application US20150303741A1, 22 Oct. 2015.

[2] M. Lu and R. E. Billo, "WIRELESS POWER TRANSMISSION". USA Patent U.S. Pat. No. 9,030,161B2, 12 May 2015.

[3] S. Abeywickrama, T. Samarasinghe, C. K. Ho and C. Yuen, "Wireless Energy Beamforming Using Received Signal Strength Indicator Feedback," IEEE Transactions on Signal Processing, vol. 66, no. 1, pp. 224-235, 2018.

What is claimed is:

1. A method of operation of an energy transmitter adapted to transmit energy to a particular energy harvester using radiative coupling, comprising:
  for each time period ($TP_i$) of a plurality of time periods ($\{TP_i\}_{i=0,1,\ldots,I-1}$) where I is a positive integer that is greater than or equal to 2:
    for each time slot ($TS_{i,j}$) of one or more time slots ($\{TS_{i,j}\}_{j=0,1,\ldots,J-1}$) where J is a positive integer that is greater than or equal to 1 for the time period ($TP_i$):
      transmitting, during the time slot ($TS_{i,j}$) of the time period ($TP_i$) on a frequency $f_{mod(i,2)}$, a radio frequency signal ($S_T(i,j)$) that is modulated with a signature of the particular energy harvester, wherein mod(*) is the modulo-2 operator such that $f_{mod(1,2)}$ is a first frequency $f_0$ for even values of i including i=0 and is a second frequency $f_1$ for odd values of i; and
    attempting, during the time period (TPi), to receive, from the particular energy harvester on a frequency fmod(i+1,2), a radio frequency signal (SR(i)) that is modulated with the signature of the particular energy harvester, wherein mod(*) is the modulo-2 operator such that fmod(i+1,2) is the second frequency f1 for even values of i including i=0 and is the first frequency f0 for odd values of i.

2. The method of claim 1 wherein, for a particular time period ($TP_{i=x}$) where x∈{0,1, . . . , I-1}, attempting to receive, from the particular energy harvester on the frequency $f_{mod(1+1,2)}$, the radio frequency signal ($S_R(i)$) that is modulated with the signature of the particular energy harvester comprises receiving during the particular time period ($TP_{i=x}$) from the particular energy harvester on a frequency $f_{mod(x+1,2)}$, a radio frequency signal ($S_R(i=x)$) that is modulated with the signature of the particular energy harvester.

3. The method of claim 2 further comprising:
  estimating a wireless channel between the energy transmitter and the particular energy harvester for the frequency fmod(x+1,2) based on the radio frequency signal (SR(i=x)) received on the frequency fmod(x+1, 2) during the particular time period (TPi=x) to provide a channel estimate for the frequency fmod(x+1,2);
  wherein, for a second particular time period (TPi=x+1), for each time slot (TSi,j) of the one or more time slots ({TSi,j}j=0,1, . . . , J-1) for the second particular time period (TPi=x+1):
    the method further comprises generating, using the channel estimate for the frequency fmod(x+1,2), a beamformed radio frequency signal that is modulated with the signature of the particular energy harvester; and
    transmitting, during the time slot (TSi,j) of the time period (TPi) on the frequency fmod(i,2), the radio frequency signal (ST(i,j)) that is modulated with the signature of the particular energy harvester comprises transmitting, during the time slot (TSi,j) of the second particular time period (TPi=x+1) on the frequency fmod(x+1,2), the beamformed radio frequency signal that is modulated with the signature of the particular energy harvester as a radio frequency signal (ST(i=x+1)).

4. The method of claim 3 wherein, for a third particular time period ($TP_{i=y}$) where y>x and a value of y is such that a frequency $f_{mod(y+1,2)}$, is the same as the frequency $f_{mod(x+1,2)}$, attempting, during the time period ($TP_i$), to receive, from the particular energy harvester on the frequency $f_{mod(i+1,2)}$, the radio frequency signal ($S_R(i)$) that is modulated with the signature of the particular energy harvester comprises receiving, during the third particular time period ($TP_{i=y}$) from the particular energy harvester on the frequency $f_{mod(y+1,2)}$, a radio frequency signal ($S_R(i=y)$) that is modulated with the signature of the particular energy harvester.

5. The method of claim 4 further comprising:
  updating the channel estimate for the frequency $f_{mod(y+1,2)}$ based on the radio frequency signal ($S_R(i=y)$) received on the frequency $f_{mod(y+1,2)}$ during the third particular time period ($TP_{i=y}$);
  wherein, for a fourth particular time period ($TP_{i=y+1}$), for each time slot ($TS_{i,j}$) of the one or more time slots ($\{TS_{i,j}\}_{j=0,1,\ldots,J-1}$) for the fourth particular time period ($TP_{i=y+1}$):
    the method further comprises generating, using the updated channel estimate for the frequency $f_{mod(y+1,2)}$, a new beamformed radio frequency signal that is modulated with the signature of the particular energy harvester; and
    transmitting, during the time slot ($TS_{i,j}$) of the time period ($TP_i$) on the frequency $f_{mod(i,2)}$, a radio frequency signal $S_T(i,j)$ that is modulated with the signature of the particular energy harvester comprises transmitting, during the time slot ($TS_{i,j}$) of the fourth particular time period ($TP_{i=y+1}$) on the frequency $f_{mod(y+1,2)}$, the new beamformed radio frequency signal that is modulated with the signature of the particular energy harvester as a radio frequency signal ($S_T(i=y+1)$).

6. The method of claim 1 wherein, for a first time period ($TP_{i=0}$) of the plurality of time periods ($\{TP_i\}_{i=0,1,\ldots,I-1}$), for each time slot ($TS_{i,j}$) of the one or more time slots ($\{TS_{i,j}\}_{j=0,1,\ldots,J-1}$) for the first time period ($TP_{i=0}$):
  transmitting, during the time slot ($TS_{i,j}$) of the time period ($TP_i$) on the frequency $f_{mod(1,2)}$, the radio frequency signal ($S_T(i,j)$) that is modulated with the signature of the particular energy harvester comprises transmitting, during the time slot ($TS_{i,j}$) of the first time period ($TP_{i=0}$), a broadly beamformed or non-beamformed radio frequency signal that is modulated with the signature of the particular energy harvester as a radio frequency signal ($S_T(i=0,j)$).

7. The method of claim 1 wherein, for each time slot ($TS_{i,j}$) of each time period ($TP_i$), the radio frequency signal ($S_T(i,j)$) that is modulated with the signature of the particular energy harvester is a spread spectrum radio frequency signal that is modulated with the signature of the particular energy harvester.

8. The method of claim 7 wherein the signature of the particular energy harvester is a particular spread spectrum signature assigned to the particular energy harvester.

9. The method of claim 1 wherein the one or more time slots ($\{TS_{i,j}\}_{j=0,1,\ldots,J-1}$) consist of a single time slot.

10. The method of claim 1 wherein the one or more time slots ($\{TS_{i,j}\}_{j=0,1,\ldots,J-1}$) comprise more than one time slot.

11. The method of claim 1 wherein the first frequency $f_0$ and the second frequency $f_1$ are both in an Industrial, Scientific, and Medical, ISM, frequency band.

12. The method of claim 1 wherein the first frequency $f_0$ and the second frequency $f_1$ are both in an unlicensed frequency band.

13. An energy transmitter adapted to transmit energy to a particular energy harvester using radiative coupling, wherein the energy transmitter is adapted to:
  for each time period (TPi) of a plurality of time periods ($\{TPi\}i=0,1,\ldots,I-1$) where I is a positive integer that is greater than or equal to 2:
    for each time slot ($TS_{i,j}$) of one or more time slots ($\{TS_{i,j}\}_{j=0,1,\ldots,J-1}$) where J is a positive integer that is greater than or equal to 1 for the time period ($TP_i$):
      transmit, during the time slot ($TS_{i,j}$) of the time period ($TP_i$) on a frequency $f_{mod(1,2)}$, a radio frequency signal ($S_T(i,j)$) that is modulated with a signature of the particular energy harvester, wherein mod(*) is the modulo-2 operator such that $f_{mod(1,2)}$ is a first frequency $f_0$ for even values of i including i=0 and is a second frequency $f_1$ for odd values of i; and
      attempt, during the time period ($TP_i$), to receive, from the particular energy harvester on a frequency $f_{mod(i+1,2)}$, a radio frequency signal ($S_R(i)$) that is modulated with the signature of the particular energy harvester, wherein mod(*) is the modulo-2 operator such that $f_{mod(i+1,2)}$ is the second frequency $f_1$ for even values of i including i=0 and is the first frequency $f_0$ for odd values of i.

14. The energy transmitter of claim 13 wherein the energy transmitter comprises:
  one or more transmitters;
  one or more receivers;
  a plurality of antennas coupled to the one or more transmitters and the one or more receivers; and
  processing circuitry connected to the one or more transmitters and the one or more receivers, the processing circuitry configured to cause the energy transmitter to:
    for each time period ($TP_i$) of the plurality of time periods ($\{TP_i\}_{i=0,1,\ldots,I-1}$):
      for each time slot ($TS_{i,j}$) of the one or more time slots ($\{TS_{i,j}\}_{j=0,1,\ldots,J-1}$
        transmit, during the time slot ($TS_{i,j}$) of the time period ($TP_i$) on the frequency $f_{mod(1,2)}$, the radio frequency signal ($S_T(i,j)$) that is modulated with the signature of the particular energy harvester; and
        attempt, during the time period ($TP_i$), to receive, from the particular energy harvester on the frequency $f_{mod(i+1,2)}$, a radio frequency signal ($S_R(i)$) that is modulated with the signature of the particular energy harvester.

15. A method of operation of an energy harvester, adapted to receive energy from an energy transmitter using radiative coupling, the method comprising:
  attempting to collect energy from a radio frequency signal on both a first frequency and a second frequency;
  determining that a threshold amount of energy has been collected and that a signature of the radio frequency signal matches a signature of the energy harvester;
  determining whether the signature of the radio frequency signal that matches the signature of the energy harvester was detected on the first frequency or the second frequency;
  upon determining that the signature of the radio frequency signal that matches the signature of the energy harvester was detected on the first frequency, transmitting a radio frequency signal modulated with the signature of the energy harvester on the second frequency; and
  upon determining that the signature of the radio frequency signal that matches the signature of the energy harvester was detected on the second frequency, transmitting the radio frequency signal modulated with the signature of the energy harvester on the first frequency.

16. The method of claim 15 further comprising repeating the process of claim 15 one or more additional times.

17. The method of claim 15 further comprising:
  determining that an amount of energy needed to perform a desired task has been collected; and
  upon determining that the amount of energy needed to perform the desired task has been collected, performing the desired task.

18. An energy harvester adapted to receive energy from an energy transmitter using radiative coupling, wherein the energy harvester is adapted to:
  attempt to collect energy from a radio frequency signal on both a first frequency and a second frequency;
  determine that a threshold amount of energy has been collected and that a signature of the radio frequency signal matches a signature of the energy harvester;
  determine whether the signature of the radio frequency signal that matches the signature of the energy harvester was detected on the first frequency or the second frequency;
  upon determining that the signature of the radio frequency signal that matches the signature of the energy harvester was detected on the first frequency, transmit a radio frequency signal modulated with the signature of the energy harvester on the second frequency; and
  upon determining that the signature of the radio frequency signal that matches the signature of the energy harvester was detected on the second frequency, transmit the radio frequency signal modulated with the signature of the energy harvester on the first frequency.

19. The energy harvester of claim 18 wherein the energy harvester comprises:
  one or more transmitters;
  one or more receivers;
  passive energy harvesting circuitry;
  one or more antennas coupled to the one or more transmitters, the one or more receivers, and the passive energy harvesting circuitry;
  processing circuitry connected to the one or more transmitters and the one or more receivers; and
  an energy storage device;
  wherein:
    the passive energy harvesting circuitry attempts to collect energy from a radio frequency signal on both a first frequency and a second frequency and store the collected energy in the energy storage device; and
    the processing circuitry is configured to cause the energy harvester to:
      determine that a threshold amount of energy has been collected and stored in the energy storage device and that a signature of the radio frequency signal matches a signature of the energy harvester;
      determine whether the signature of the radio frequency signal that matches the signature of the energy harvester was detected on the first frequency or the second frequency;

upon determining that the signature of the radio frequency signal that matches the signature of the energy harvester was detected on the first frequency, transmit a radio frequency signal modulated with the signature of the energy harvester on the second frequency; and upon determining that the signature of the radio frequency signal that matches the signature of the energy harvester was detected on the second frequency, transmit the radio frequency signal modulated with the signature of the energy harvester on the first frequency.

* * * * *